US008683833B2

(12) United States Patent
Marschalek et al.

(10) Patent No.: US 8,683,833 B2
(45) Date of Patent: Apr. 1, 2014

(54) ELECTRONIC ACCESS CONTROL HANDLE SET FOR A DOOR LOCK

(75) Inventors: James S. Marschalek, Hartland, WI (US); Warren A. Simonsen, Menomonee Falls, WI (US); Ludger Voss, Munich (DE); Herbert Meyerle, Maisach (DE); Norbert Voss, Munich (DE); Stefan Parhofer, Munich (DE)

(73) Assignee: Simonsvoss Technologies AG, Unterfohring (DE)

( * ) Notice: Subject to any disclaimer, the term of this patent is extended or adjusted under 35 U.S.C. 154(b) by 900 days.

(21) Appl. No.: 12/295,744

(22) PCT Filed: Apr. 4, 2007

(86) PCT No.: PCT/EP2007/003069
§ 371 (c)(1),
(2), (4) Date: Oct. 2, 2008

(87) PCT Pub. No.: WO2007/113010
PCT Pub. Date: Oct. 11, 2007

(65) Prior Publication Data

US 2009/0273440 A1 Nov. 5, 2009

Related U.S. Application Data

(63) Continuation-in-part of application No. 10/726,260, filed on Dec. 2, 2003, now abandoned, which is a (Continued)

(30) Foreign Application Priority Data

May 9, 2003 (DE) ................................. 103 20 873

(51) Int. Cl.
*E05B 55/04* (2006.01)
*B60R 25/04* (2013.01)

(52) U.S. Cl.
USPC ................ 70/473; 70/149; 70/222; 70/278.7; 70/283

(58) Field of Classification Search
USPC ................ 70/149, 218, 222, 223, 257, 278.1, 70/278.7, 283, 422, 472, 473, 474, 482; 292/DIG. 27
See application file for complete search history.

(56) References Cited

U.S. PATENT DOCUMENTS 886,778 A 5/1908 Dunlap .......................... 192/59
998,615 A 7/1911 Hueke ............................ 464/38

(Continued)

FOREIGN PATENT DOCUMENTS

DE 1 553 518 12/1970
DE 37 42 189 6/1989

(Continued)

OTHER PUBLICATIONS

"Notification of Transmittal of Translation of the International Preliminary Report on Patentability" for International application No. PCT/EP2004/004903, filed May 7, 2004.

(Continued)

*Primary Examiner* — Christopher Boswell
(74) *Attorney, Agent, or Firm* — Westman, Champlin & Koehler, P.A.

(57) ABSTRACT

The present invention provides for a handle set for a lock with a latch, the handle set having an authentication circuit and actuator in the interior handle that allow access to authenticated transponders. The present invention also provides a device and method for transmitting a rotational movement and force in an electronic lock, wherein the transmission takes place in a coupled state and not in a decoupled state and wherein the transmission of force does not damage an actuator that requires little energy to change between the coupled and decoupled states. A coupling cartridge of an electronic lock can easily be handed. The electronic lock can be retrofitted in installed mortise locks and used with cylindrical locks. The electronic lock can include a security feature that prohibits the electronic lock from changing between the coupled and decoupled states.

31 Claims, 19 Drawing Sheets

Related U.S. Application Data

(63) continuation-in-part of application No. 10/705,021, filed on Nov. 11, 2003, now abandoned, application No. 12/295,744, which is a continuation-in-part of application No. 10/556,012, filed as application No. PCT/EP2004/004903 on May 7, 2004.

(60) Provisional application No. 60/744,268, filed on Apr. 4, 2006.

(56) References Cited

U.S. PATENT DOCUMENTS

| | | | | |
|---|---|---|---|---|
| 1,437,160 | A | 11/1922 | Sokolov et al. | 70/189 |
| 1,725,833 | A | 8/1929 | Simpson | 192/59 |
| 2,339,980 | A | 1/1944 | George | 70/422 |
| 2,797,564 | A | 7/1957 | Bonneau et al. | 464/38 |
| 2,911,816 | A | 11/1959 | Herbert et al. | 70/386 |
| 3,659,444 | A | 5/1972 | Wellekens | 70/360 |
| 4,108,482 | A | 8/1978 | Dietrich et al. | 70/472 |
| 4,712,398 | A | 12/1987 | Clarkson et al. | 70/276 |
| 4,770,651 | A | 9/1988 | Friedrich | 464/38 |
| 4,773,240 | A | 9/1988 | Foshee | 70/222 |
| 4,848,115 | A | 7/1989 | Clarkson et al. | 70/278.2 |
| 4,854,143 | A | 8/1989 | Corder et al. | 70/218 |
| 4,854,459 | A | 8/1989 | DeJonge | 215/220 |
| 4,920,773 | A | 5/1990 | Surko, Jr. | 70/224 |
| 5,010,752 | A | 4/1991 | Lin | 70/277 |
| 5,040,391 | A | 8/1991 | Lin | 70/277 |
| 5,040,652 | A | 8/1991 | Fish et al. | 70/189 |
| 5,083,122 | A * | 1/1992 | Clark | 70/278.1 |
| 5,279,137 | A | 1/1994 | Orbell | 70/218 |
| 5,419,597 | A | 5/1995 | Brackmann et al. | 292/201 |
| 5,437,174 | A | 8/1995 | Aydin | 70/278 |
| 5,447,047 | A * | 9/1995 | Lin | 70/218 |
| 5,531,086 | A | 7/1996 | Bryant | 70/279 |
| 5,542,274 | A | 8/1996 | Thordmark et al. | 70/277 |
| 5,552,777 | A | 9/1996 | Gokcebay et al. | 70/278.3 |
| 5,628,216 | A * | 5/1997 | Qureshi et al. | 70/278.7 |
| 5,640,863 | A | 6/1997 | Frolov | 70/283 |
| 5,712,626 | A * | 1/1998 | Andreou et al. | 70/278.1 |
| 5,826,450 | A | 10/1998 | Lerchner et al. | 70/78.3 |
| 5,946,955 | A * | 9/1999 | Suggs et al. | 70/218 |
| 5,960,656 | A | 10/1999 | Yao | 70/278.1 |
| 5,992,189 | A | 11/1999 | McCaa | 70/149 |
| 6,000,609 | A | 12/1999 | Gokcebay et al. | 70/277 |
| 6,062,612 | A | 5/2000 | Lin | 292/144 |
| 6,112,564 | A | 9/2000 | Rathmann et al. | 70/279.1 |
| 6,116,664 | A | 9/2000 | Wegner | 292/216 |
| 6,286,347 | B1 | 9/2001 | Frolov | 70/472 |
| 6,297,725 | B1 * | 10/2001 | Tischendorf et al. | 70/278.1 |
| 6,334,348 | B1 | 1/2002 | Chen | 70/277 |
| 6,357,270 | B1 | 3/2002 | Vazquez | 70/472 |
| 6,367,296 | B1 | 4/2002 | Dupont | 70/257 |
| 6,370,928 | B1 | 4/2002 | Chies et al. | 70/278.3 |
| 6,374,653 | B1 | 4/2002 | Gokcebay et al. | 70/278.3 |
| 6,418,765 | B1 | 7/2002 | Chiu | 70/277 |
| 6,435,573 | B1 | 8/2002 | Szablewski | 292/201 |
| 6,442,986 | B1 | 9/2002 | Russell et al. | 70/278.3 |
| 6,487,884 | B1 | 12/2002 | Constantinou | 70/277 |
| 6,517,127 | B1 | 2/2003 | Lu et al. | 292/144 |
| 6,640,594 | B1 | 11/2003 | Yao | 70/277 |
| 6,647,753 | B2 | 11/2003 | Engler | 70/472 |
| 6,651,468 | B2 | 11/2003 | Aramburu et al. | 70/222 |
| 6,725,693 | B2 | 4/2004 | Yu et al. | 70/107 |
| 6,826,935 | B2 * | 12/2004 | Gokcebay et al. | 70/278.3 |
| 6,845,642 | B2 | 1/2005 | Imedio Ocana | 70/277 |
| 6,854,302 | B2 | 2/2005 | Zapushek et al. | 70/34 |
| 6,865,913 | B2 * | 3/2005 | Yamagishi | 70/224 |
| 6,895,791 | B2 * | 5/2005 | Alexander et al. | 70/277 |
| 7,007,527 | B1 * | 3/2006 | Zehrung | 70/278.7 |
| 7,096,698 | B2 | 8/2006 | Walsh et al. | 70/472 |
| 2004/0025550 | A1 * | 2/2004 | Yamagishi | 70/278.1 |
| 2004/0183652 | A1 | 9/2004 | Deng et al. | 340/5.53 |
| 2007/0051145 | A1 | 3/2007 | Chang | 70/279.1 |
| 2007/0137266 | A1 | 6/2007 | Hsai | 70/34 |
| 2007/0214848 | A1 | 9/2007 | Meyerle et al. | 70/278.2 |
| 2008/0011030 | A1 | 1/2008 | Ferreira Sanchez et al. | 70/223 |
| 2008/0121001 | A1 | 5/2008 | Huang et al. | 70/91 |
| 2009/0025438 | A1 | 1/2009 | Don et al. | 70/224 |
| 2009/0027197 | A1 | 1/2009 | Frolov | 340/542 |

FOREIGN PATENT DOCUMENTS

| | | | |
|---|---|---|---|
| DE | 93 14 065.7 | U1 | 12/1993 |
| DE | 297 03 559 | U1 | 6/1997 |
| DE | 196 39 545 | | 12/1997 |
| DE | 198 54 879 | C1 | 8/2000 |
| DE | 100 49 476 | A1 | 4/2002 |
| DE | 100 49 477 | A1 | 5/2002 |
| DE | 100 65 155 | A1 | 6/2002 |
| DE | 101 00 787 | A1 | 7/2002 |
| DE | 198 51 308 | C2 | 11/2002 |
| DE | 102 12 798 | A1 | 1/2003 |
| DE | 102 49 972 | A1 | 5/2004 |
| DE | 20 2005 003 764 | U1 | 6/2005 |
| EP | 0 588 209 | A1 | 9/1993 |
| EP | 0 743 411 | | 11/1996 |
| EP | 0 805 905 | | 11/1997 |
| EP | 0 976 896 | A2 | 6/1999 |
| EP | 1 072 741 | | 1/2001 |
| EP | 1 079 050 | | 2/2001 |
| WO | WO 98/44224 | | 10/1998 |
| WO | WO 2004/020767 | | 3/2004 |
| WO | WO 2004/033936 | | 4/2004 |

OTHER PUBLICATIONS

US Office Action from corresponding U.S. Appl. No. 10/726,260, dated Sep. 3, 2010.

US Office Action from corresponding U.S. Appl. No. 10/726,260, dated Jan. 13, 2010.

US Office Action from corresponding U.S. Appl. No. 10/726,260, dated May 12, 2009.

US Office Action from corresponding U.S. Appl. No. 10/726,260, dated Jun. 23, 2008.

US Office Action from corresponding U.S. Appl. No. 10/726,260, dated Sep. 25, 2007.

US Office Action from corresponding U.S. Appl. No. 10/726,260, dated Feb. 20, 2007.

US Office Action from corresponding U.S. Appl. No. 10/726,260, dated May 30, 2006.

US Office Action from corresponding U.S. Appl. No. 10/726,260, dated Dec. 28, 2005.

US Office Action from corresponding U.S. Appl. No. 10/726,260, dated Sep. 6, 2005.

US Office Action from corresponding U.S. Appl. No. 10/726,260, dated Feb. 16, 2005.

US Office Action from corresponding U.S. Appl. No. 10/705,021, dated Sep. 20, 2005.

US Office Action from corresponding U.S. Appl. No. 10/556,012, dated Feb. 10, 2012.

US Office Action from corresponding U.S. Appl. No. 10/556,012, dated Jul. 1, 2011.

US Office Action from corresponding U.S. Appl. No. 10/556,012, dated Dec. 27, 2010.

US Office Action from corresponding U.S. Appl. No. 10/556,012, dated Jun. 16, 2010.

US Office Action from corresponding U.S. Appl. No. 10/556,012, dated Aug. 3, 2009.

US Office Action from corresponding U.S. Appl. No. 10/556,012, dated Apr. 6, 2009.

"Notification of Transmittal of the International Search Report and the Written Opinion of the International Searching Authority", from corresponding application No. PCt/EP2007/003069, dated Nov. 2, 2007.

* cited by examiner

FIG. 18
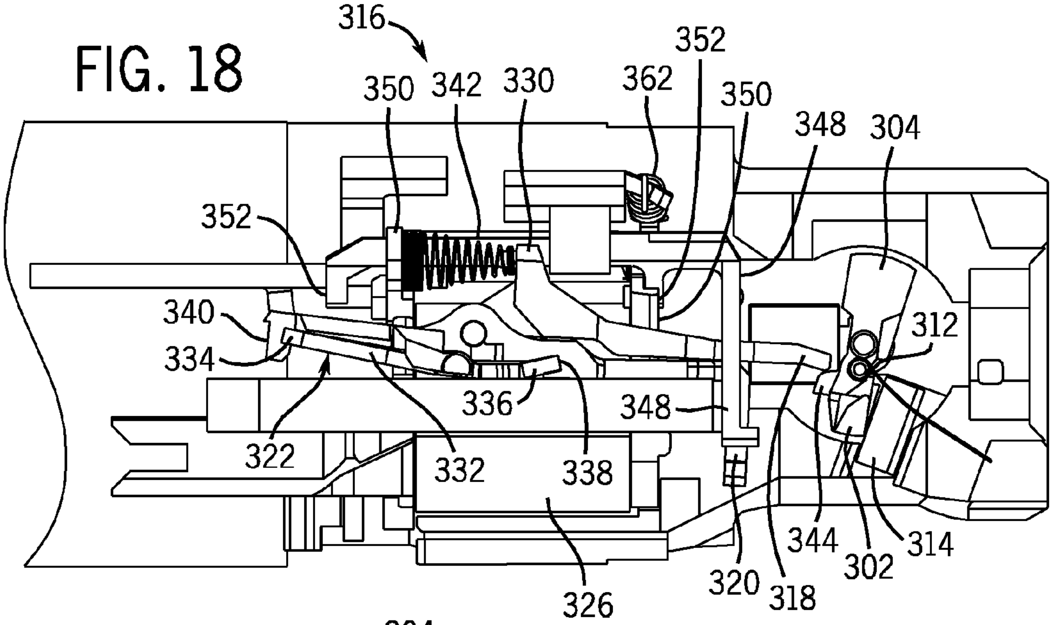
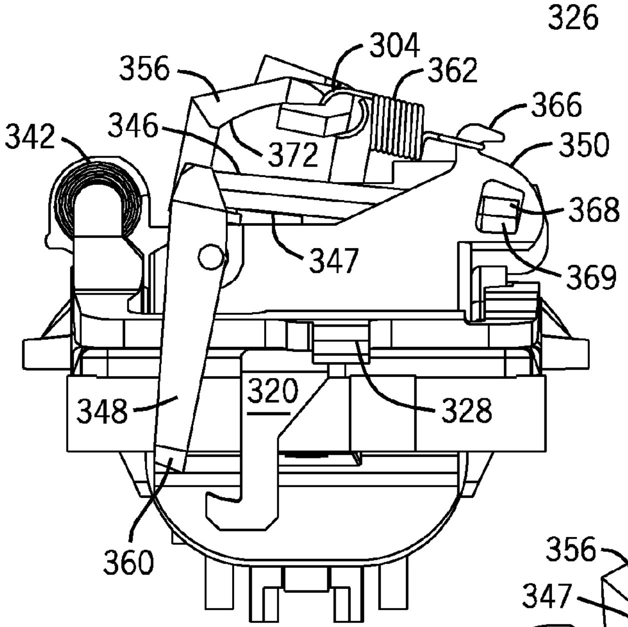
FIG. 20
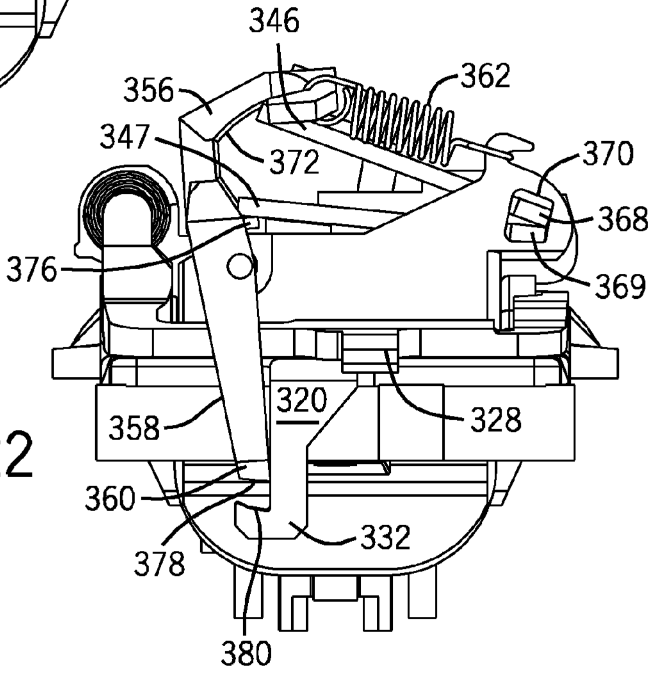
FIG. 22

FIG. 19
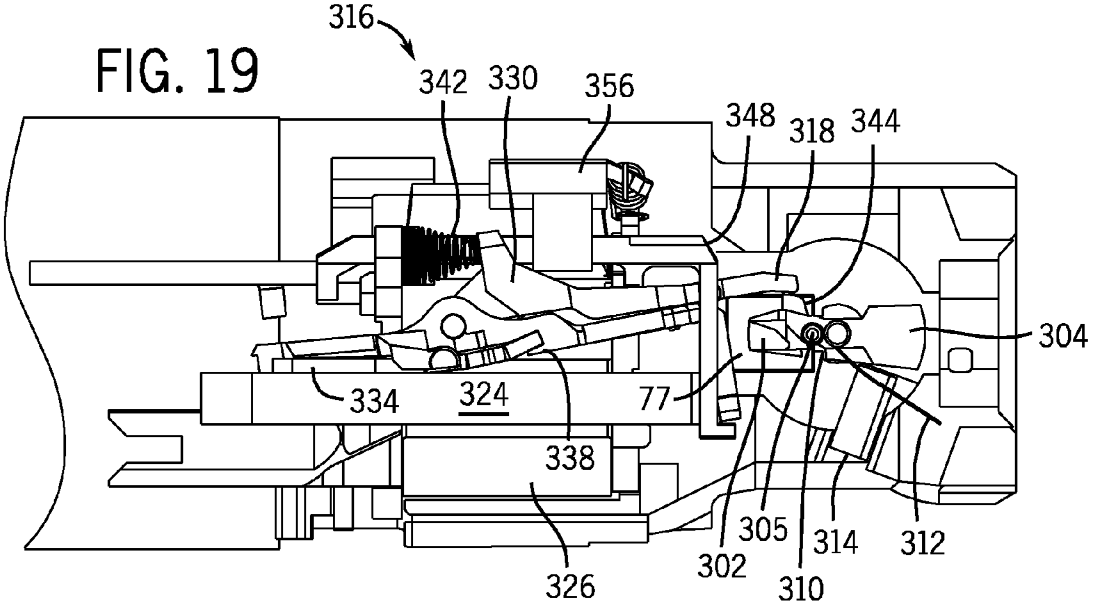
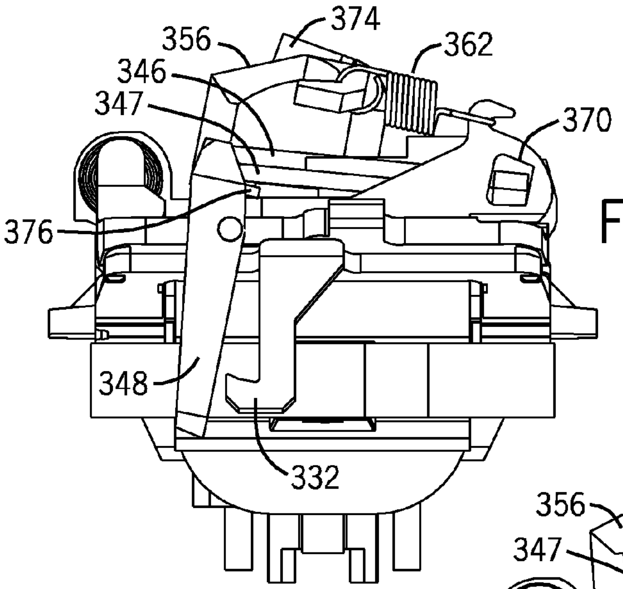
FIG. 21
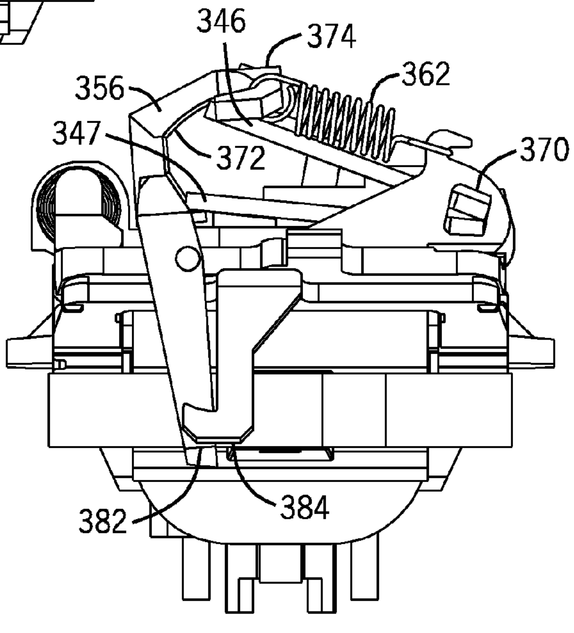
FIG. 23

ELECTRONIC ACCESS CONTROL HANDLE SET FOR A DOOR LOCK

CROSS-REFERENCE TO RELATED APPLICATIONS

This application is a Section 371 National Stage Application of International Application No. PCT/EP2007/003069, filed Apr. 4, 2007, published on Oct. 11, 2007, in English, this application is also a continuation-in-part of U.S. application Ser. No. 10/726,260, filed Dec. 2, 2003, which claims priority to German application No. 103 20 873.9, filed May 9, 2003, Ser. No. 10/726,260 is a continuation-in-part of U.S. application Ser. No. 10/705,021, filed Nov. 11, 2003, which claims priority to German Application No. 103 20 873.9, filed May 9, 2003, the contents of which are hereby incorporated by reference as if fully set forth herein; and this application is also a continuation-in-part of U.S. patent application Ser. No. 10/556,012, which is a national phase of international PCT application No. PCT/EP2004/004903, filed May 7, 2004, which claims priority to German Application No. 103 20 873.9, filed May 9, 2003, the contents of which are hereby incorporated by reference as if fully set forth herein; and International Application No. PCT/EP2007/003069 also claims the benefit of U.S. Provisional patent application Ser. No. 60/744,268, filed Apr. 4, 2006, and entitled "Handel Set for a Door Lock," hereby incorporated by reference as if fully set forth herein.

STATEMENT CONCERNING FEDERALLY SPONSORED RESEARCH OR DEVELOPMENT

Not applicable.

FIELD OF THE INVENTION

The present invention provides for an electronic lock and lever set for a lock, the handle set having an authentication circuit and actuator in the interior handle that allow access only to authenticated transponders. The present invention relates also to a device and method, in particular for transmitting a movement as well as corresponding forces and/or moments and, in particular, a rotational movement to a lock, wherein the transmission takes place in a coupled state, but not in a decoupled state and wherein the lock cannot change between coupled and decoupled states when secured by a security assembly. The present invention also relates to a device and method for selecting the handedness of a lock.

BACKGROUND OF THE INVENTION

Although key-operated locking mechanical systems may provide adequate protection in most situations, there are some drawbacks associated with their use. Firstly, keys for the most part can be easily copied and distributed to unauthorized users. Also, if the key is ever lost or stolen, it might be necessary to replace the whole lock cylinder in order to assure that an unauthorized user does not gain access. This can be a significant disadvantage in some cases. For example, it could be costly and rather inconvenient for a business location having many employees to replace a lock cylinder each time an employee loses his key.

As an alternative to conventional key-operated mechanical locking systems, locking arrangements were designed which utilize electronic access control means for keyless entry. U.S. Pat. No. 5,447,047 discloses a keyless entry deadbolt locking system wherein an electronic access control means, in the form of a decoding means, is located next to the knob on the outside of the door. When the decoding means is decoded by an authorized user, a coil is energized such that a rod is moved rightward and the extensions of the rod are caused to engage with grooves of a disc whereby a shaft can be rotated and the door can be opened. Although the deadbolt offers security against prying, one of the disadvantages of this locking system is that the electronic access control means can be accessed from the outside, and thus can be tampered with.

German Patent 198 51 308, the contents of which are incorporated herein by reference, describes a locking system for a door wherein the access control means is located within a knob on the inside of the door. The electronic access control means comprises a wireless data signal receiver which receives signals transmitted from a remote transmitter operated by a user. Once an authorized signal is recognized by the access control means, a solenoid is activated to control a coupling element which in turn allows the lock to be moved in a locked or unlocked position using a knob on the outside of the door. Since the remote transmitter transmits data signals using an alternating magnetic field, data signals can be transmitted with acceptable reception quality through even highly secure metal laminated doors. This allows the access control means to be placed on the inside of the door where it would be protected against tampering from the outside. However, this is only advantageous with locking cylinder standards which consist of a single element that goes through the whole door. The U.S. standard cylinder is a single cylinder. So the electronics in the knob are on the outside and can easily be manipulated. If the access control means are located on the inside of the door, an expensive through connection is necessary, which is dependent on the type of door and lock and which is furthermore difficult to install.

U.S. Pat. No. 5,531,086 discloses a keyless entry deadbolt lock arrangement for a door wherein the access control means is located within the door. The deadbolt lock arrangement can be opened manually by inserting a key or operating a switch, or opened remotely by using a RF (radio frequency) remote controller to activate an actuator that places the lock in a locked or unlocked position. Since reception of the wireless signal by the access control means located within the door can pose a problem depending on the type of door, the top portion of the housing containing the locking cylinder is provided with openings in order to permit better reception of the signal transmitted by the remote transmitter.

U.S. Pat. Appl. No. 2004/0255628, the contents of which are incorporated herein by reference, describes an electronic lock system with improved lock and transponder for securing a door that is easy to install and can easily be retrofitted. The keyless electronic door lock system has an access control means which is located within the cylinder body of the lock.

Some electronic locks require a coupling interface that transmits the movement from the outside handle to the latch to open the door in the unlocked state (coupled state) and to allow for the handle to rotate, but not transmit, the movement to the latch in the locked state (decoupled state). DE-C-37 42 189 discloses a lock cylinder, the coupling of which is connected to the locking bit and can be brought into engagement on one side with a bossed shaft. In order to configure such a lock cylinder in a more simple manner and to achieve better protection against unauthorized use of the lock cylinder, it is proposed that the bossed shaft be enclosed by a locking sleeve which can be displaced axially by the coupling and secured in certain positions.

EP-A-1 072 741 discloses a lock cylinder, in particular, an electronic lock cylinder with electromechanical rotational blocking in which the electronic key has opposing electrical terminals on the shaft and the rotatable core of the lock cylinder has an external annular track that is electrically conducting, and with its inner face, communicates with an electrical contact supported on the terminal whereas the external annular track is supported in the electrical brushes of the external and internal rotors.

EP-A-0 743 411 discloses a lock device in which the key of the lock device comprises a code transmitter formed by a transponder. An actuator, a transponder reading device, and a power supply device are arranged in the cylinder housing of the lock cylinder of the lock means. The actuator serves for displacing a locking means which locks or releases the cylinder core and which engages at the circumference of the cylinder core.

EP-A-1 079 050 discloses a lock means comprising a lock bit being blockable by a locking mechanism, wherein a coupling is arranged between the blocking mechanism and the lock bit. The coupling can be separated from only one side of the lock means. The lock means should thus be unlockable from this side without any access authorization for the locking mechanism.

EP-B-0 805 905 discloses a closing mechanism for a door comprising a spindle, an actuating means turning the spindle, a locking element in functional connection with the spindle to lock the door, and a coupling element fitted in the actuating means and acting on the rotation of the spindle. The coupling element moreover has a pin which moves to and from axially to the spindle and which can be moved to and fro via a spindle by means of a locking element arranged independent of the actuating means via an electric motor drivable by means of an electronic control in order for either to transmit the rotation of the freely rotatable actuating means to the spindle or, in the case of an actuating means, being rigidly connected with the shaft to allow only a slight rotation of the actuating means connected with the shaft. Moreover, a cam is formed on the pin and a spiral spring is clamped as a force storage means between the cam and the spindle of the electric motor, and on the front surface of the actuating means a contact disk is provided via which the electronic control from an electronic information carrier can be controlled via data exchange.

Known coupling interface devices and methods of this kind prove to be disadvantageous in that relatively much energy is demanded for shifting the coupling or lock element that forces acting on the coupling element in the coupled and decoupled states and causes a load of the lock element and that a load of the coupling element or lock element is transmitted to the drive or actuator.

U.S. patent application Ser. No. 10/705,021 published as 2005/0050929, the contents of which are incorporated herein by reference, describes an electronic lock that requires relatively little energy for shifting the coupling or lock element. The coupling mechanism is shifted into the coupled and decoupled states by a bi-stable actuator that is powered by batteries. The actuator rotates to move a coupling locking element into a position where it causes the lock to be in a coupled state. The coupling locking element moves in a linear direction. In the coupled state, the coupling locking element allows for the rotational force from the exterior knob to be transferred to the latch in order to open the door. In the decoupled state, the rotational force from the exterior knob is not transferred to the latch.

U.S. patent application Ser. No. 10/556,012, the contents of which are incorporated herein by reference, describes an electronic lock with a coupling locking element that is positioned between two reel elements in the coupled state so that reels can overcome the mechanical potential of a take-off, and thereby cause the latch to operate. In the decoupled state, the coupling locking element is not positioned between the reels, and the reels cannot overcome the mechanical potential of the take-off.

The coupling interface and/or actuator may not be configured to handle the stress of the forces exerted by the user, especially when excessive force is exerted through a lever. The transmission of forces to the drive or actuator can result in increased wear and reduced functional safety. In the United States, building codes may require that locks have levers, and levers can transmit large amounts of torque to a lock. Low-energy electronic lock mechanisms may not be strong enough to handle the torque from a lever without breaking or wearing down.

Building and fire codes may require that a lock be operable by exerting a downward force on a lever (e.g. a code may require that lock must be operable by persons with disabilities). Depending on the orientation of the door (left-hand or right-hand), the downward direction of the outside lever of a lock may be a clockwise or a counterclockwise direction. Using the outside of the door as a reference (i.e. the side of the door where one locks the door after exiting the room that the door encloses), a left-hand door is an inward swinging door with hinges on the left side and a right-hand door is an inward swinging door with the hinges of the right side. Some locks can be handed, which means that the locks can be employed in a left-hand or a right-hand door arrangement by rearranging the interrelationship of some of the internal components of the lock. Presently, for those locks which cannot be so handed, two separate models must be manufactured and inventoried throughout the trade. For the locks that can be handed, some locks can be handed by specially trained personnel in the field, and some locks require handing by trained personnel at the factory or by a locksmith. Locks are typically installed by carpenters or other building tradesmen with no special locksmith training so that even the partial disassembly and reassembly of the intricate components by such personnel to "hand" the lock results in a maximum of frustration, limited success, and added expense. The alternate choice of engaging a locksmith to install the lock adds considerable expense.

Electronic door locks may be susceptible to tampering, especially when the lock circuitry and/or actuator are/is located within the exterior handle. Door locks utilizing magnetic/electromagnetic actuators should be secured against tampering by an applied external magnetic field.

It can also be difficult to provide electronic lock hardware that mechanically interacts with existing conventional door locks, and it can be especially difficult to provide electronic lock hardware that can be retrofitted into installed/mounted conventional door locks. Electronic lock hardware that can be retrofitted into installed/mounted conventional door locks should be easy to install so that installation does not require a locksmith.

SUMMARY OF THE INVENTION

The present invention provides a handle set for a door lock having a latch, the handle set having an authenticator circuit and actuator preferably arranged in or at least partially in an interior handle so that they are protected from tampering from the exterior side of the door. The handle set can be retrofitted into existing door locks thereby turning the door lock into an electronic lock and/or forming an electronic door locking and lever assembly. In one embodiment of the invention, the exterior handle is coupled to the latch when the handle set is in a coupled state and a blocking member is in a coupled position. The handle set is configured to allow the exterior handle to transfer force to a coupling apparatus without transmitting large amounts of force to the blocking member when the blocking member is in the coupled position. In another embodiment of the invention which relates to a double lock design, the interior handle and the exterior handle can be coupled to the latch when the handle set is in a coupled state, so that the door can be opened by the interior handle and the exterior handle. In this embodiment both the inside handle and the outside handle require an authorization and the coupling apparatus to be in a coupled state. The coupling apparatus can be adapted to couple in a coupled state both the interior handle and the exterior handle. In an alternative embodiment, the coupling apparatus can be adapted to couple the interior handle and the exterior handle independent from each other.

The present invention provides a coupling cartridge for an electronic lock with an exterior handle, an interior handle, a lock body with a latch, and an access control circuit. The coupling cartridge is configured to handle increased torque transmitted by a lever without damaging a low-power actuator. For example, in one embodiment of the invention, the coupling cartridge comprises a coupling member with spring ramps, a plurality of camming blocks rotatably coupled to the exterior handle, and a blocking member; wherein the camming blocks can transmit rotation and force from the exterior handle to the coupling member when the blocking member is positioned between the camming blocks and wherein the camming blocks cannot transmit rotation and force from the exterior handle to the coupling member when the blocking member is not positioned between the camming blocks.

The present invention also provides a security apparatus configured to prevent the blocking member from moving to a position between the camming blocks and from a position between the camming blocks so that the electronic lock cannot change between coupled and decoupled states unless authorized to do so.

The present invention also provides a coupling cartridge with a plurality of handing marks that allows for untrained personnel to hand the electronic lock.

The present invention also provides for a method of handing a coupling cartridge having a coupling member with a right-hand marling and a left-hand marking, an interior handle linkage with a first alignment marking, and an exterior handle linkage with a second alignment marling, the method comprising rotating the coupling member to align one of the right-hand marking and left-hand marking between the first and second alignment markings.

BRIEF DESCRIPTION OF THE DRAWINGS

The invention will hereafter be described with reference to the accompanying drawings, wherein like reference numerals denote like elements, and:

FIG. 11*b* is a sectional view of a coupling mechanism and actuator assembly in a decoupled state;

FIG. 18 is a side view of an actuator assembly of a handle set in a decoupled state;

FIG. 19 is a side view of an actuator assembly of a handle set in the coupled state;

FIG. 20 is an end view of a security assembly and an actuator assembly of a handle set in an unsecured and decoupled state;

FIG. 21 is an end view of a security assembly and an actuator assembly of a handle set in an unsecured and coupled state;

FIG. 22 is an end view of a security assembly and an actuator assembly of a handle set in a secured and decoupled state;

FIG. 23 is an end view of a security assembly and an actuator assembly of a handle set in a secured and coupled state;

Figure 1:
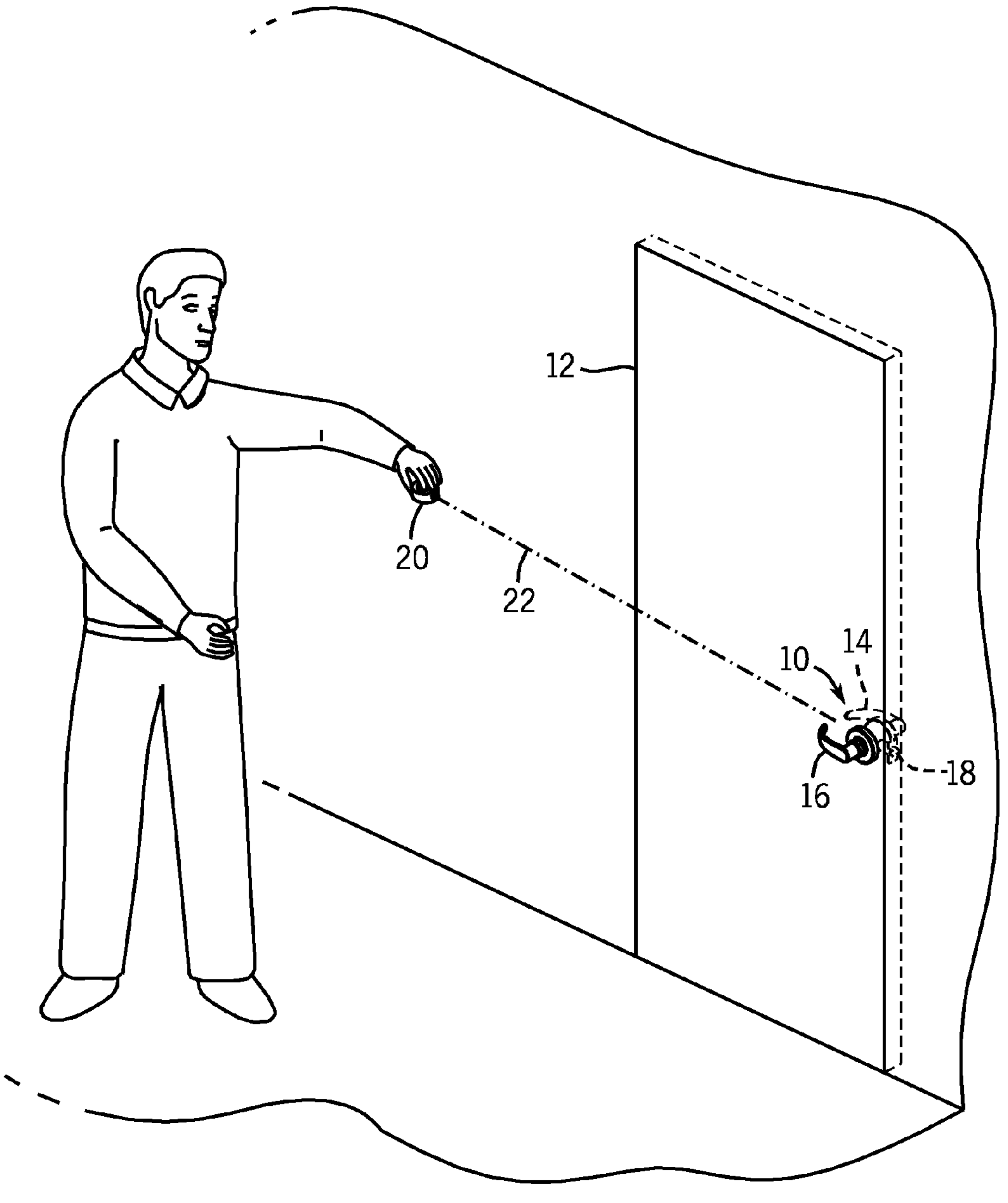
FIG. 1 is a view of a handle set according to the present invention installed in a door.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 2:
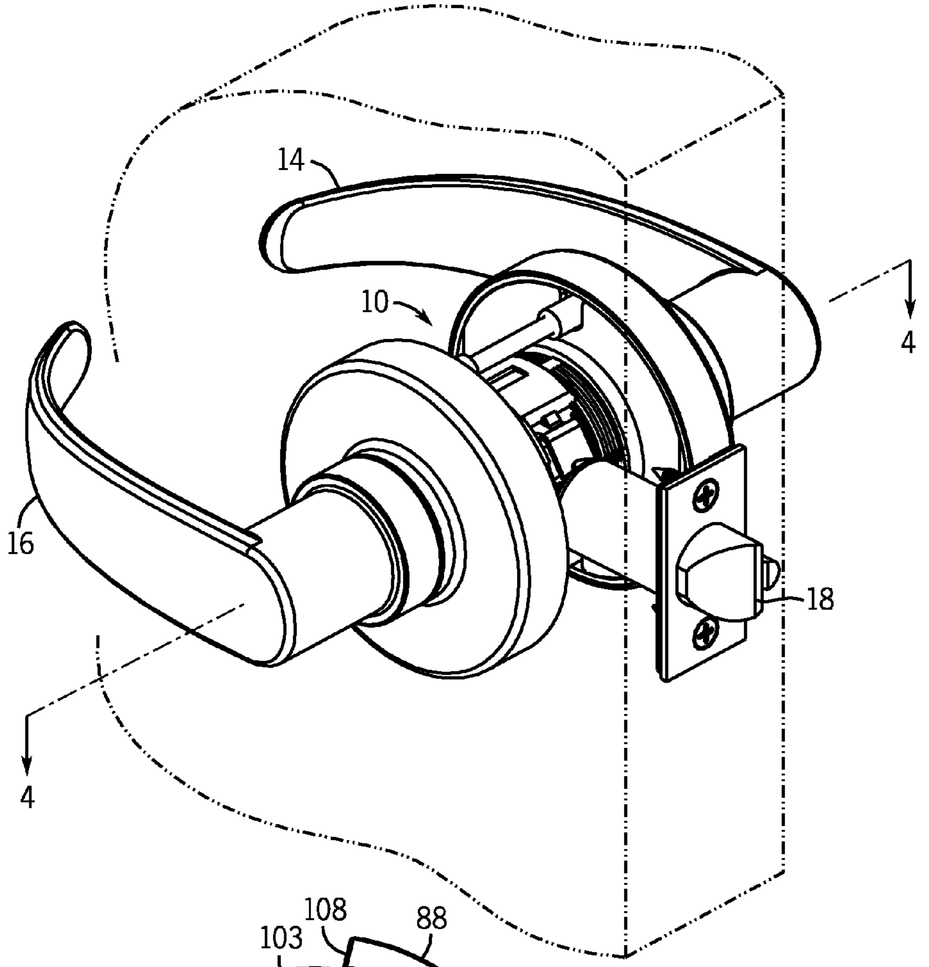
FIG. 2 is a perspective view of a handle set for a cylindrical lock according to an embodiment of the present invention installed in a door that is shown in phantom.

Referring now to FIGS. 1 and 2, there is generally shown handle set hardware for a lock 10, which makes the lock an electronic door lock or electronic door locking and lever assembly, in accordance with an embodiment of the invention as operatively mounted in a door 12 or other type of closure panel. The lock hardware 10 is constructed in a conventional cylindrical configuration, having interior and exterior handles 14 and 16, respectively, that are cooperatively connected through the door 12 to operatively move and lock a latch member 18. The latch member 18 engages a strike plate (not shown) in a door frame (not shown) to secure or release the door 12 for pivotal motion within the door frame in a manner well known in the art. The lock hardware 10 is normally in a decoupled state which means that the exterior handle 16 cannot cause the latch member 18 to move. When the lock hardware 10 is in the decoupled state, the exterior handle 16 may rotate, but this rotation is not coupled to the latch member 18. The lock hardware 10 is configured so that the interior handle 14 can always cause the latch member 18 to move so that the door can always be opened from the interior. In an alternative embodiment, the lock hardware 10 can be a double lock and the interior handle 14 can operate like the exterior handle 16 in the coupled and decoupled states.

Upon activation by a user, an authorization means 20 which can be a transponder 20 as shown in FIG. 1 communicates a wireless data signal 22 to access control circuitry (not shown) of the lock hardware 10. The access control circuitry determines whether or not the wireless data signal 22 identifies an authorized transponder. If the transponder 20 is determined to be an authorized device, the access control circuitry causes the lock 10 to change to a coupled state so that the exterior handle 16 can cause the latch member 18 to move to open the door. After a period of time, the access control circuitry causes the lock hardware to return to the decoupled state so that the exterior handle 16 can no longer cause the latch member 18 to move. The access control circuitry may also be configured to change from the coupled to the uncoupled state when an appropriate signal is sent from the transponder. The verification of an authorization means such as the transponder or some other type of key could occur in the transponder or some other authorization device and the lock 10 can be sent a signal to couple or decouple. In this context, a transponder can be adapted as a portable device which can be worn and/or carried by a user (i.e. as a credential) as shown in FIG. 1 and/or can be mounted at the door or next to the door and/or within the exterior handle. The transponder contains data for authorization and is able to communicate wirelessly and/or passively. The transponder can be activated by a user. The lock hardware 10 may also be set on a timer to place the lock in the coupled and decoupled state for a certain time in the day. A control center could also cause a wireless signal to be sent to couple/decouple the lock 10. The access control circuitry can be programmed wirelessly, and can be controlled, programmed, and read out through a wireless network. In particular, the access control circuitry can be programmed from a programming device, including a central computer, through wireless data exchange, e.g., via Bluetooth, Zigbee, a mobile phone or other wireless technology in the LF or RF frequency band, wherein information stored in the access control circuitry can be retrieved and transmitted to a programming device or a central computer. Further, the access control means can be programmed such that the coupling apparatus 36 couples either only temporarily (e.g. 10 seconds after a correct authorization of a user) or switches permanently to the coupled state (until switched back from the coupled to the uncoupled state through the next authorized user) or switches automatically between the coupled and the uncoupled state at predetermined time units (e.g. day/night mode).

The access control circuitry can contain a processor or processing unit, a memory storage device or memory unit, a power supply (comprising, e.g., a battery and/or an accu and/or a solar cell and/or a fuel cell and/or a piezo-electric device) and/or a communication device (comprising, e.g., an antenna and/or a RFID unit and/or passive reader) configured to send and/or receive non-contact signals (e.g. wireless signals, RFID signals, passive electromagnetic signals). In an embodiment, the processing unit and the memory unit can be located within the interior handle. Further, the processing unit can compare a received signal of a user requesting access to the data stored in the memory unit and can activate an actuator of an access control device 75 described below to change a coupling apparatus from the decoupled state to the coupled state.

In a further embodiment, the antenna or any other communication device for the wireless data exchange can be located within the interior handle and/or within the exterior handle. In a further embodiment the antenna or any other communication device for the wireless data exchange can be located in an interior or exterior rose of the lock 10. The antenna can be connected to the processing unit through a wire that is conducted through a connecting element 72 of the coupling apparatus, wherein the antenna is preferably suited to receive and handle signals from common-used passive cards, e.g., operating at a frequency of 125 kHz or 13.56 MHz.

In a preferred embodiment, the access control circuitry and the communication device are housed within the interior handle 14. The communication device can also be housed in the exterior handle 16 and can be wirelessly and/or electrically connected to the access control circuitry by wire(s) run through the lock hardware 10. The exterior handle 16 can include a biometric reader or biometric fingerprint sensing unit configured to transmit information to the access control circuitry via a wire or wirelessly. The biometric fingerprint sensing unit can be equipped with a processing unit, a memory and a wireless data exchange unit, wherein the biometric fingerprint sensing unit can compare a user's fingerprint with a fingerprint stored in the memory and can send a wireless authorization signal to the access control circuitry in, e.g., the interior handle.

In a further embodiment, when the exterior handle 16 is operated a signal is transmitted to an access control circuitry in the interior handle 14, causing the access control circuitry to emit a wireless request signal e.g. to a users credential. In a further embodiment, the exterior handle 16 comprises a capacitive sensor which is able to sense a human's skin, wherein upon detection of a human skin a wireless request signal is emitted.

The handles 14 and 16 can also have LEDs or other such visual indicators that can be used to indicate the status of the lock hardware 10 and/or access control circuitry.

Figure 3:
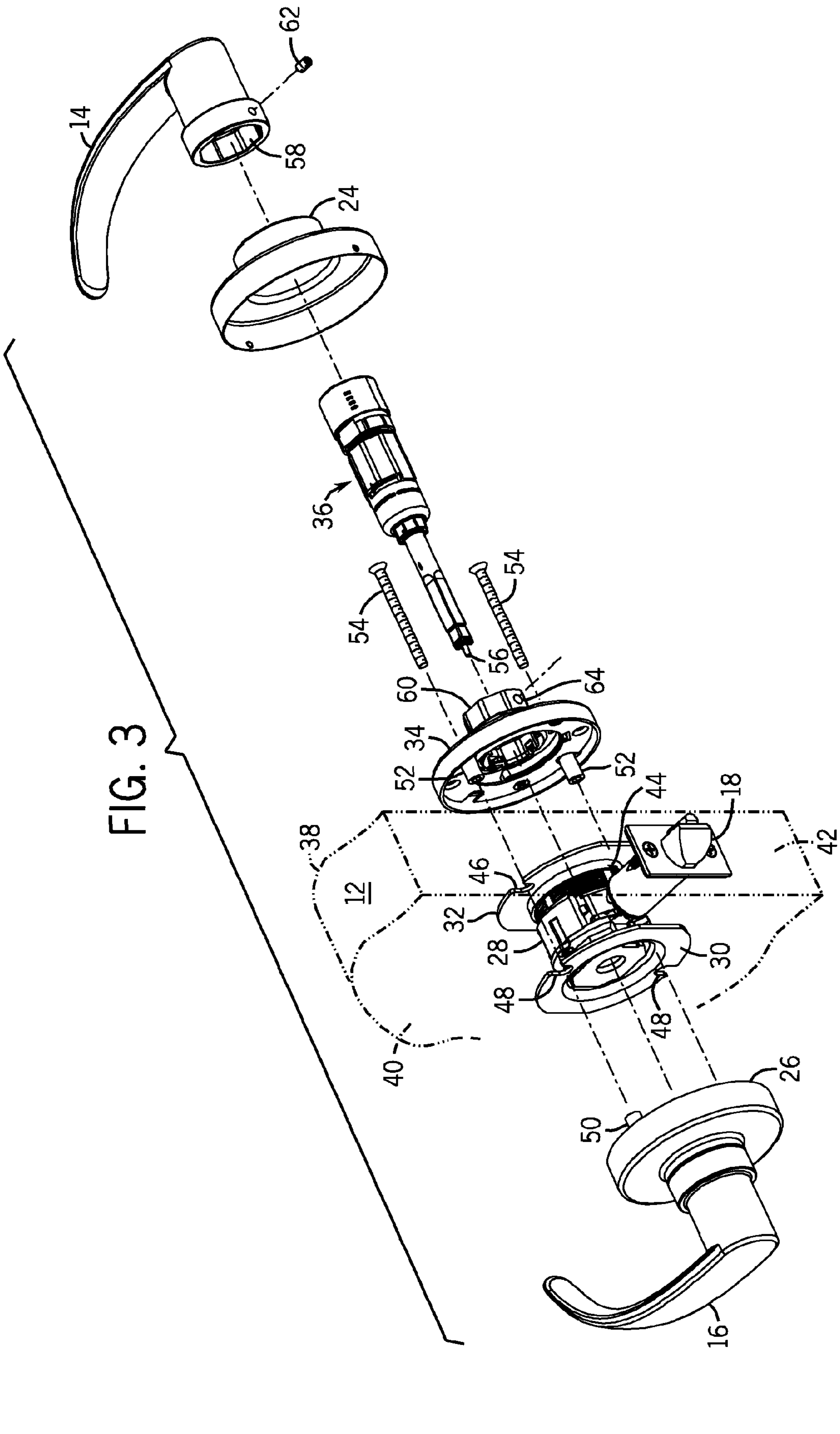
FIG. 3 is an exploded view of a handle set for a cylindrical lock according to an embodiment of the present invention.
Figure 4:
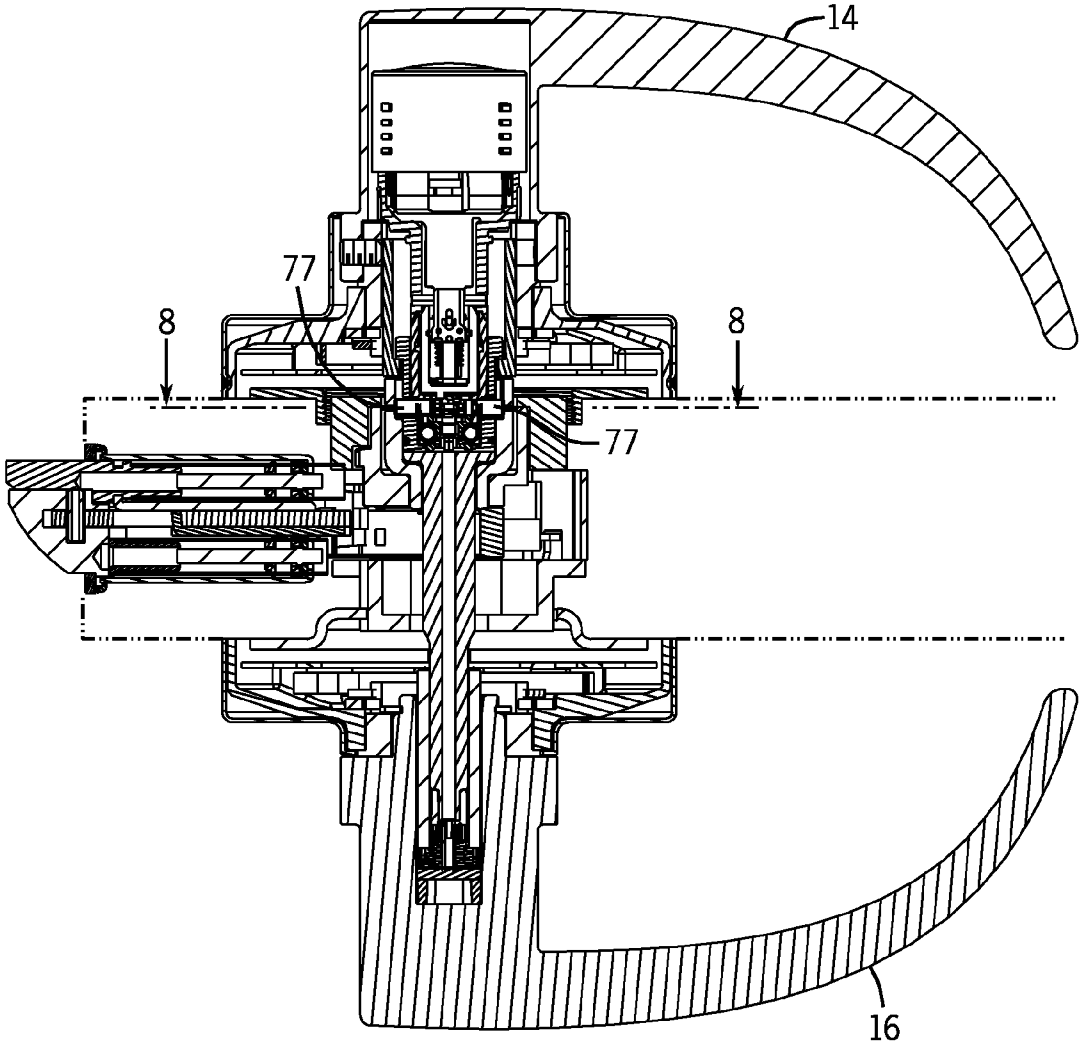
FIG. 4 is a section view of the handle set shown in FIG. 3.

Referring now to FIGS. 3 and 4, a handle set for a cylindrical door lock 10 in accordance with a first embodiment of the present invention can be installed in a door in a conventional manner. The door lock 10 has interior and exterior handles 14 and 16, respectively, and interior and exterior roses 24 and 26, respectively. The exterior handle 16 is rotatably attached to the exterior rose 26 so that an attack of over-torque on the rose 26 is not transmitted to the handle 16 or the internal components of the lock 10. The lock 10 further comprises a latch member 18, a lock body 28 having an exterior flange 30, a lock body interior flange 32, an interior rose spring assembly 34, and a coupling cartridge 36.

The lock 10 can be installed in a door 12 that has a cylindrical hole (not shown) through the door 12, the openings (not shown) of a cylindrical hole in the door 12 being on the interior face 38 and exterior face 40 of the door 12. A latch hole (not shown) in the door 12 extends from the edge 42 of the door 12 to a portion of the door (not shown) that forms a side surface of the cylindrical hole. To install the lock 10, the latch member 18 is first inserted into the latch hole in the door 12. The lock body 28 is then inserted into the cylindrical hole in the door 12 so that the exterior flange 30 rests against the exterior face 40 of the door 12. The lock body 28 and the latch member 18 mechanically interact with each other in a conventional manner. Next, threaded portion 44 of the lock body interior flange 32 is inserted into the cylindrical hole of the door 12 so that the flange 32 rests against the exterior face 40 of the door 12 and so that threading 44 of the lock body interior flange 32 can engage threading (not shown) of the lock body 28. The lock body interior flange 32 is then threaded into the lock body 28 so that the lock body 18 is secured in the door 12 and so that notches 46 (one not shown) of the lock body interior flange 32 line up with notches 48 of the exterior flange 30. Threaded bosses 50 (one not shown) of the exterior rose 26 are then fed through notches 48 of the exterior flange 30. Guide tubes 52 of the interior rose spring assembly 34 are then fed through the notches 46 of the interior flange 32. Bolts 54 are then inserted into the guide tubes 52 of the interior rose spring assembly 34, and then the bolts 54 are fastened into the threaded bosses 50 of the exterior rose 26. The coupling cartridge 36 is then handed as described hereinafter. Next, exterior end 46 of the coupling cartridge 36 is inserted through a hole (not shown) in the interior rose spring assembly 34 until the exterior end 46 engages a mechanical interface (not shown) of the exterior handle 16. Interior handle 14 is inserted through interior rose 24 and a faceted end 58 of the handle 14 is placed onto a faceted outer portion 60 of the interior rose spring assembly 32. A set screw 62 is then screwed into a set screw receptor 64 in the faceted outer portion 60 so that the handle 14 is secured to the interior rose spring assembly 32. The interior rose 24 is then twisted one-quarter turn, concealing the set screw and securing the rose through an interlock between dimples on the rose and grooves in the interior rose spring assembly 32 to complete the lock assembly 10. In an alternative embodiment, the coupling cartridge 36 can be upon manufacturer permanently left-handed or right-handed.

Figure 6:
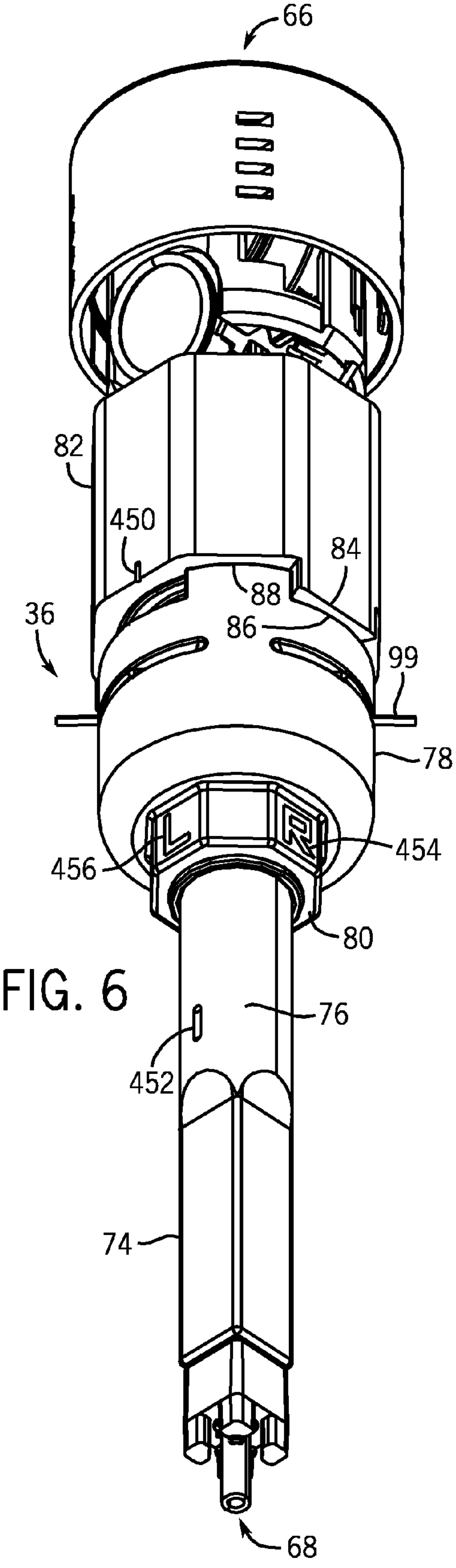
FIG. 6 is a perspective view of a coupling cartridge of a handle set in a left-hand orientation.
Figure 7:
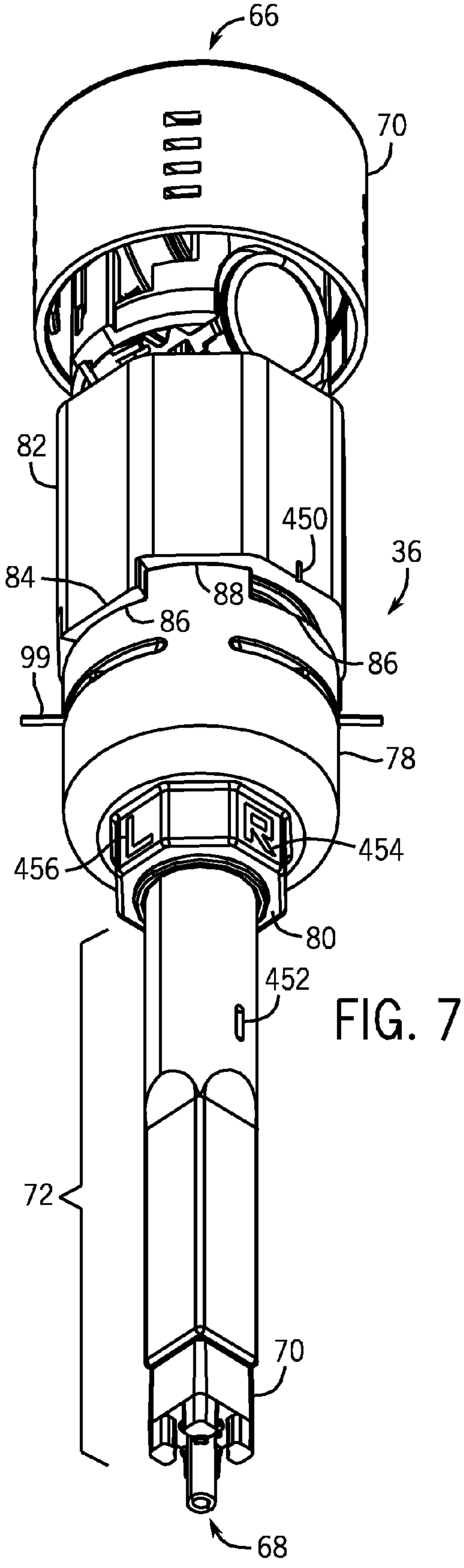
FIG. 7 is a perspective view of a coupling cartridge of a handle set a right-hand orientation.

Referring now to FIGS. 6 and 7, the coupling cartridge 36 has an interior end 66 and an exterior end 68. The exterior end 68 comprises a piezoelectric speaker spring mount 70 attached to the exterior-most portion of an exterior handle shaft 72. The exterior handle shaft 72 comprises a square shaft portion 74 adjacent to where the spring mount 70 is attached and a round shaft portion 76 located interior of the square shaft portion 74. As is known in the art, the square shaft portion 74 is sized and dimensioned to interfit with a square shaft adapter (not shown) of the exterior handle 16 so that the exterior handle 16 can be rotatably linked to the exterior handle shaft 72, and so that the exterior handle 16 can transfer torque to the exterior handle shaft 72. The exterior handle shaft 72 has a hollow center (not shown) configured so that wires may be run through its interior portion.

As will be discussed hereinafter, the coupling cartridge 36 further comprises an outer coupling member 78 that is coupled to the exterior handle 16 when the lock 10 is in the coupled state and is not coupled to the exterior handle 16 when the lock 10 is in the decoupled state. The outer coupling member 78 comprises an octagonal link member 80 that interfits with the lock body 28 so that the octagonal link member 80 can cause the lock body 28 to operate the latch 18 when the outer coupling member 78 is rotated.

The coupling cartridge 36 further comprises a faceted coupling barrel 82 that has two teeth 84. The teeth 84 of the faceted coupling barrel 82 are positioned within two slots 86 of the outer coupling member 78. The teeth 84 of the faceted coupling barrel 82 can be rotated to act against two teeth 88 of the outer coupling member 78 so as to cause the outer coupling member 78 to rotate thus causing the latch 18 to operate. As will be discussed hereinafter, the orientation of the faceted coupling barrel 82 in relation to the outer coupling member 78 depends on the handedness of the coupling cartridge 36.

The coupling cartridge 36 comprises a coupling apparatus which comprises a drive and a take-off, wherein the drive is formed essentially by the exterior handle shaft 72 and a force transfer member 83. Further, the take-off is formed essentially by the outer coupling member 78 and the link member 80. The link member 80 is a latch actuating means that actuates the latch member 18 to open the door 12. When the coupling apparatus is in a coupled state, the drive 72, 83 is coupled to the take-off 78, 80 wherein a movement of the exterior handle 16 can be transmitted from the drive 72, 83 to the take-off 78, 80 to actuate the latch member 18 to open the door. When the coupling apparatus is in a decoupled state the drive 72, 83 is decoupled from the take-off 78, 80 so that a movement of the exterior handle 16 is not suitable to operate the tale-off 78, 80 to actuate the latch member 18 to open the door 12. Further, a coupling barrel 82 which forms the coupling element 82 is linked to the take-off 78, 80 and further linked to the interior handle 14, so that, when the interior handle 14 is moved or rotated the movement is transmitted to the coupling element 82 which moves the tale-off 78, 80 so that the latch member 18 can be operated when the coupling apparatus 36 is in a coupled or decoupled state.

The coupling cartridge 36 comprises further an access control circuit cover 90 disposed on the interior end 66 of the coupling cartridge 36 and removably attached to an access control circuit housing (not shown), and covers and/or partially covers components of the access control circuit including an electronic circuit board (not shown), a pair of batteries (not shown), a piezoelectric speaker (not shown), and an antenna (not shown). A piezoelectric speaker (not shown), or other such speaker, can be housed within the exterior handle 16. The antenna can also be positioned within the exterior handle 16. The elements contained within the coupling cartridge 36 will be discussed hereinafter.

Figure 8:
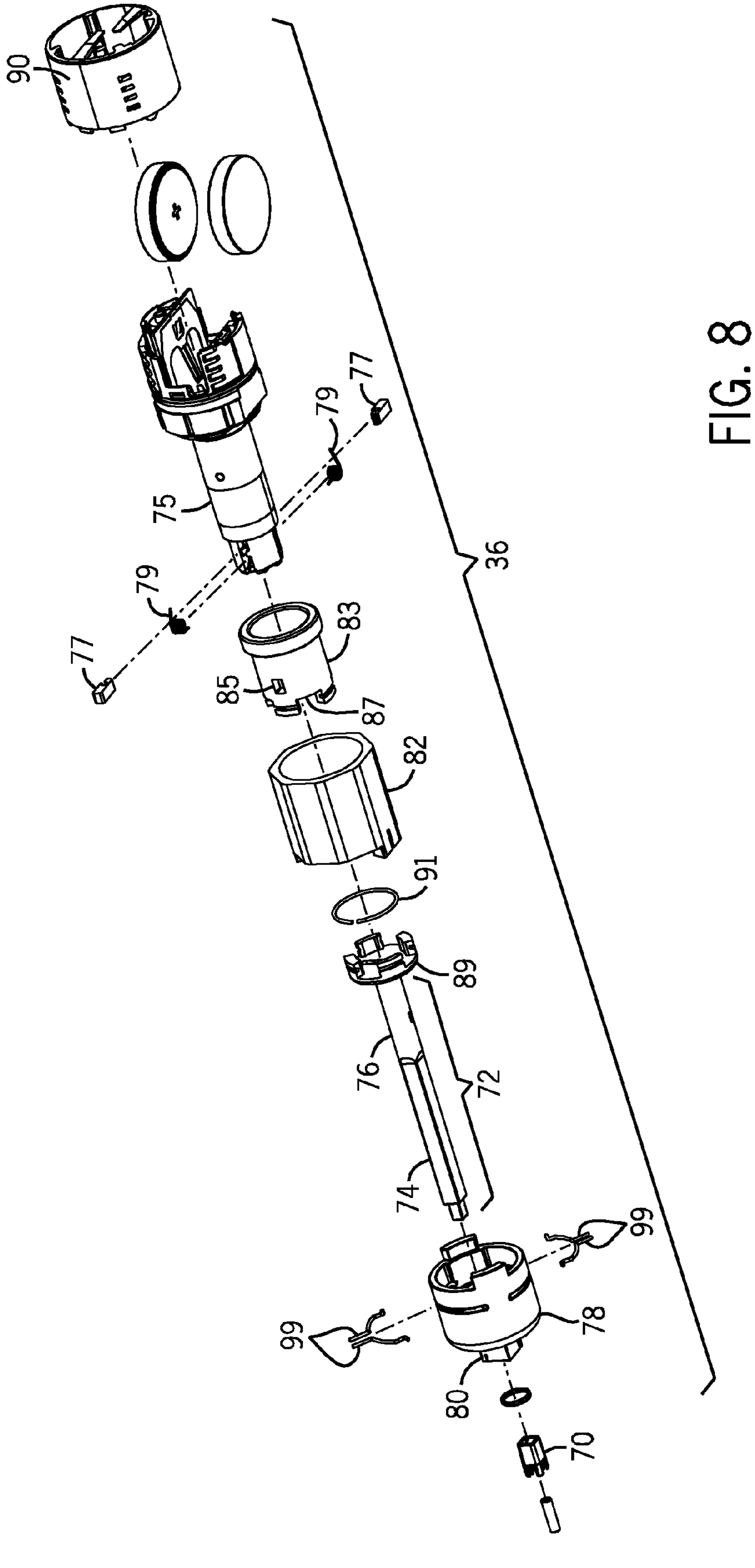
FIG. 8 is an exploded view of a coupling cartridge according to an embodiment of the present invention.

Referring now to FIG. 8, an exploded view of the coupling cartridge 36 according to an embodiment of the invention is shown. The coupling cartridge 36 includes an access control device 75. As will discussed hereinafter, the access control device 75 houses the access control circuitry, the actuator, and a linkage system that connects the actuator to a blocking member 300. The access control device 75 can move the blocking member 300 to a coupled position and to a decoupled position. In the coupled position, the blocking member 300 is positioned in between two coupling rectangular camming blocks 77, the camming blocks 77 positioned within the outer coupling member 78. Torsion springs 79 are connected to the camming blocks 77 and to a force transfer member 83. The torsion springs 79 are positioned within the inner diameter of the force transfer member 83. The force transfer member 83 is positioned within the inner diameter of the outer coupling member 78 and within the inner diameter of the faceted coupling barrel 82. The force transfer member 83 has rectangular holes 85 that extend through the force transfer member 83 from its inner curvilinear face to its outer curvilinear face. The camming blocks 77 are fitted within the rectangular holes 85 of the force transfer member 83 so that the camming blocks 77 are perpendicular to the outer face of the force transfer member 83. The camming blocks 77 can slide towards and away from the center of the force transfer member 83. The torsion springs 79 force the camming blocks 77 radially outward towards the outer coupling member 78. The force transfer member 83 has a notched and toothed end 87 that interfits with a notched and toothed end 89 of the exterior handle shaft 72. A retaining ring 91 can be disposed in the notches of the end 87 and end 89 when they are interfitted together to keep the ends 87 and 89 together. The exterior handle 16 can cause the exterior handle shaft 72 to rotate, the exterior handle shaft 72 can cause the force transfer member 83 to rotate in the same direction as the exterior handle 16, and the force transfer member 83 can cause the camming blocks 77 to rotate in the same direction as the exterior handle 16. The holes 85 and the walls of the holes 85 of the force transfer member 83 are sized and dimensioned so as to transfer force to the camming blocks 77 without allowing the camming blocks 77 to rotate relative to the holes 85 and without allowing the camming blocks 77 to tilt relative to the outer surface of the force transfer member 83. Therefore, the exterior handle 16 is always coupled to the camming blocks 77 so that rotational movement of the exterior handle 16 causes rotational movement of the camming blocks 77 in the same direction.

Figure 5:
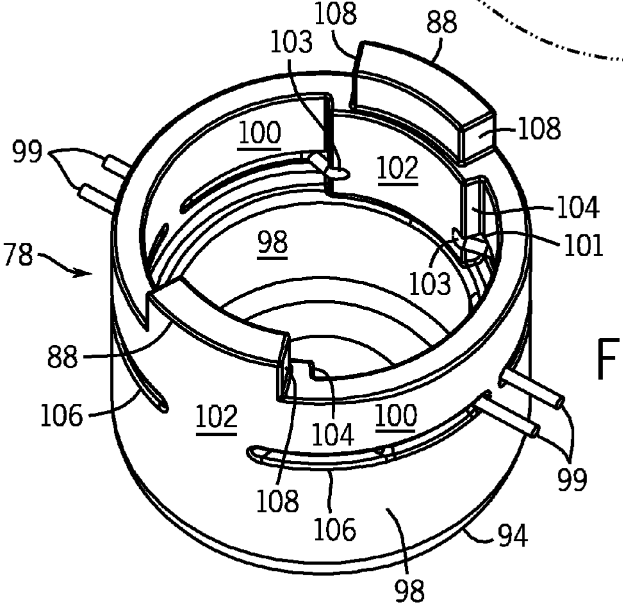
FIG. 5 is a perspective view of an outer coupling member according to an embodiment of the present invention.

Referring now to FIG. 5, an outer coupling member 78 according to an embodiment of the invention has an interior end 92 and an exterior end 96. The octagonal link member 80 is disposed on the exterior end 96 (as shown in FIGS. 6 and 7). The teeth 88 of the outer coupling member 78 are disposed on the interior end 92. The outer coupling member 78 has a body 98, four spring mount portions 100, and two coupling walls 102. The inner and outer faces of the body 98, spring mount portions 100, and coupling walls 102 are curvilinear. The body 98 is generally proximate to the octagonal link member 80. The outer diameters of the body 98 and spring mount portions 100 are the same. The inner diameter of the body 98 is smaller than the inner diameter of the spring mount portions 100. The inner diameter of the coupling walls 102 is larger than the inner diameter of the body 98 and smaller than the inner diameter of the spring mount portions 100. The inner and outer faces of the coupling walls 102 are curvilinear. Each of the coupling walls 102 has two edges 104 that are defined by generally radial lines from the center of the outer coupling member 78. The spring mount portions 100 each include a groove 106, each groove having a mounting slot and a ramp slot formed therein that holds a spring ramp 99 in place (as will be discussed hereinafter). The coupling walls 102 include channels 101 in which ramped ends 103 of the spring ramps 99 are positioned, the channels 101 allowing the ramped ends 103 of the spring ramps 99 to be pushed radially outward. The teeth 88 extend above the coupling walls 102 and have curvilinear inner and outer faces. The outer diameter of the teeth 88 is equal to the outer diameter of the coupling walls 102 and the inner diameter of the teeth 88 is larger than the inner diameter of the coupling walls 102 and is less than the inner diameter of the spring mount portions 100. The teeth 88 have edges 108 that are defined by generally radial lines from the center of the outer coupling member 78.

Figure 9A:
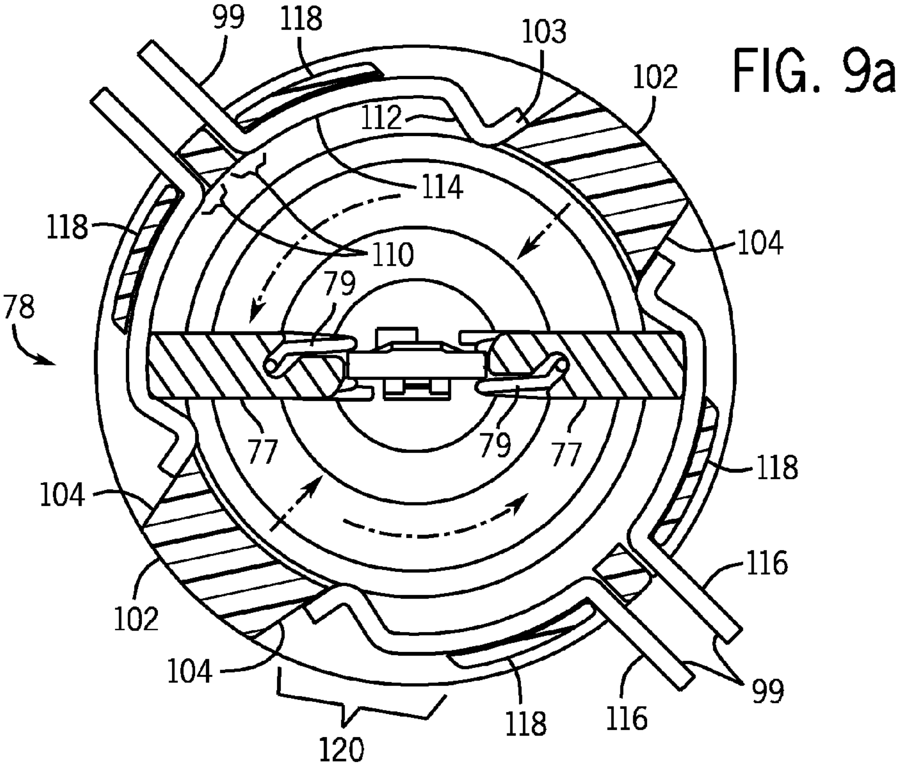
FIG. 9*a* is a sectional view of a coupling mechanism in a decoupled state.

Referring to FIG. 9*a*, the spring ramps 99 have a ramp end 103, a ramp portion 112, a curvilinear portion 114, and straight end 116. Each spring ramp 99 is positioned within a groove 106 of a spring mount portion 100. Each groove 106 includes a mounting slot 110, a groove wall 118, and a ramp slot 120. The straight end 116 of the spring ramp 99 extends through the mounting slot 110. The curvilinear portion 114 of the spring ramp 99 is adjacent to the inner portion of the groove wall 118. The straight end 116 can be bent around the outer portion of the groove wall 118 to mount the spring ramp 99 in place. The ramp portion 100 of the spring ramp 99 defines a ramp that begins at the curvilinear portion 114 and extends inward, the ramp ending at the ramp end 103. The ramp end 103 extends outward through the channels 101 of the coupling walls 102 so that the spring ramps 99 are not blocked from moving outward by the coupling walls 102.

Figure 9B:
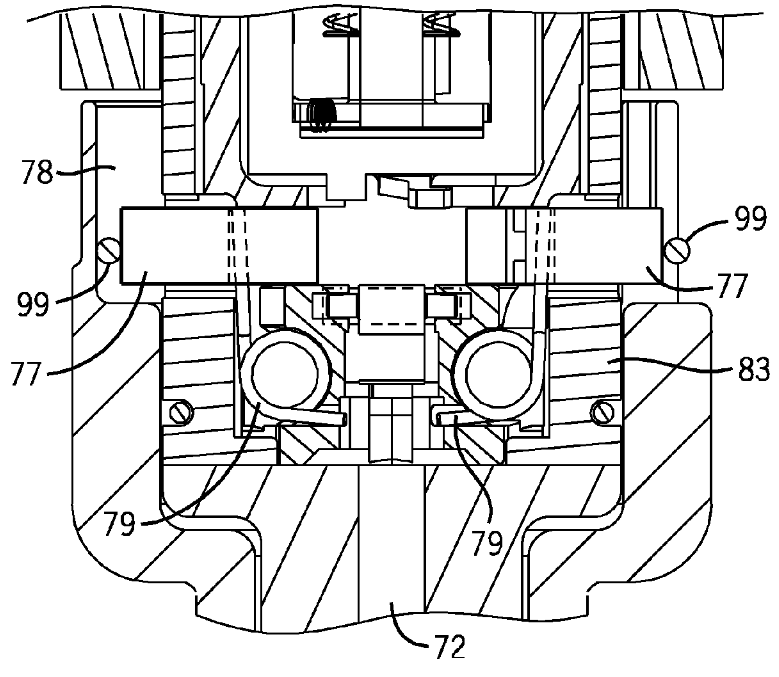
FIG. 9*b* is a sectional view of an electronic lock in a decoupled state.
Figure 10A:
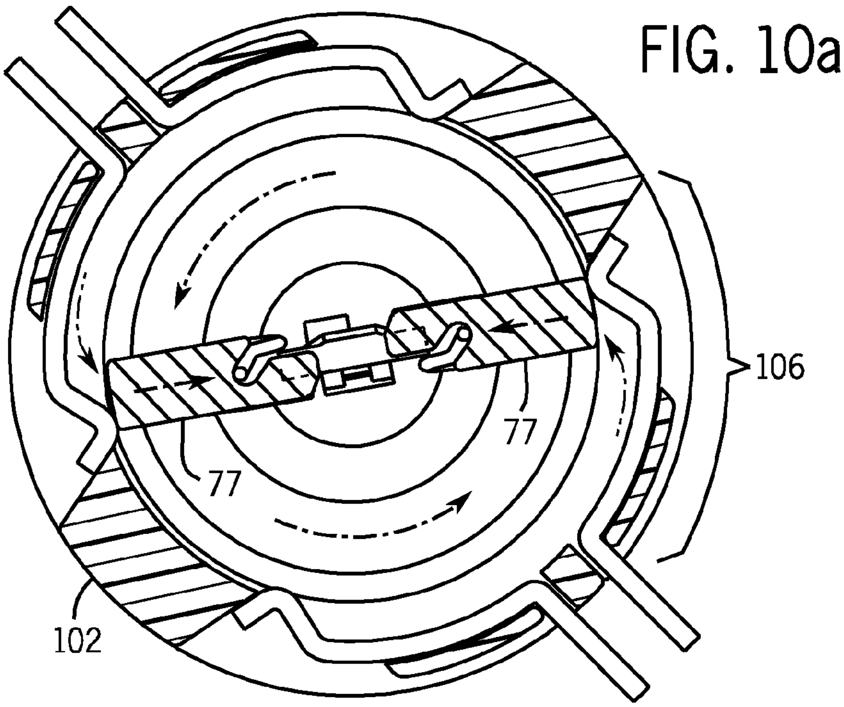
FIG. 10*a* is a sectional view of a coupling mechanism in a decoupled state.
Figure 10B:
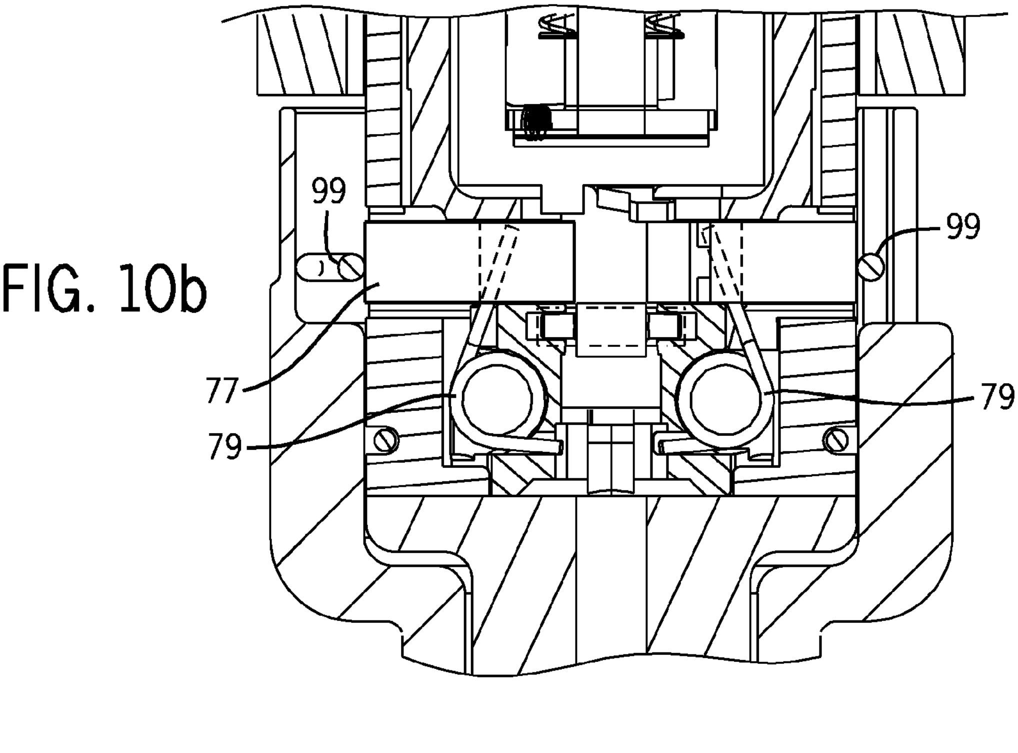
FIG. 10*b* is a sectional view of a coupling mechanism and actuator assembly in a decoupled state.

Referring to FIGS. 9*a* and 9*b*, the lock 10 is in the decoupled state, which means that the blocking member 300 is not positioned between the camming blocks 77. The lock 10 has been handed (as will be discussed hereinafter) so that each of the camming blocks 77 is positioned nearer to one coupling wall 102 than to the other coupling wall 102 when the exterior handle 14 has not been rotated from its default position. The torsion springs 79 outwardly push the camming blocks 77 so that they contact a pair of spring ramps 99. When the exterior handle 14 is rotated, rotation is transferred to the camming blocks 77 and the camming blocks 77 cam on the spring ramps 99 in the direction of rotation of the exterior handle 14. When the camming blocks 77 are rotated toward the nearest coupling wall 102, the camming blocks 77 will cam along the ramp portions 112 of the spring ramps 99. As shown in FIGS. 10*a* and 10*b*, the ramp portions 112 cause the camming blocks 77 to be forced inward as the camming blocks 77 cam on the ramp portions 112 because the force of the torsion springs 79 is overcome. The camming blocks 77 are not able to overcome the force of the spring ramps 99; therefore, the camming blocks 77 do not contact the edges 104 of the coupling walls 102. The camming blocks 77 can cam over the ramp portions 112 and then can cam along the coupling walls 102. Not enough force is transferred from the camming blocks 77 to the coupling walls 102 to cause the outer coupling member 78 to rotate. If the camming blocks 77 are rotated in a direction away from the nearest coupling walls 102, the camming blocks 77 cam along the spring ramps 99, but will not rotate enough to reach the ramp portions 102.

Figure 11A:
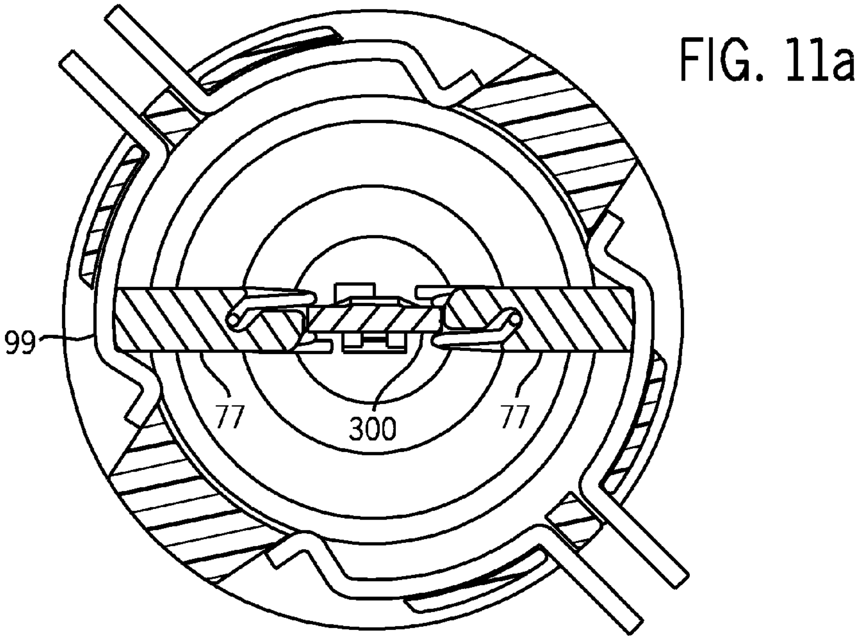
FIG. 11*a* is a sectional view of a coupling mechanism in a coupled state.
Figure 11A:
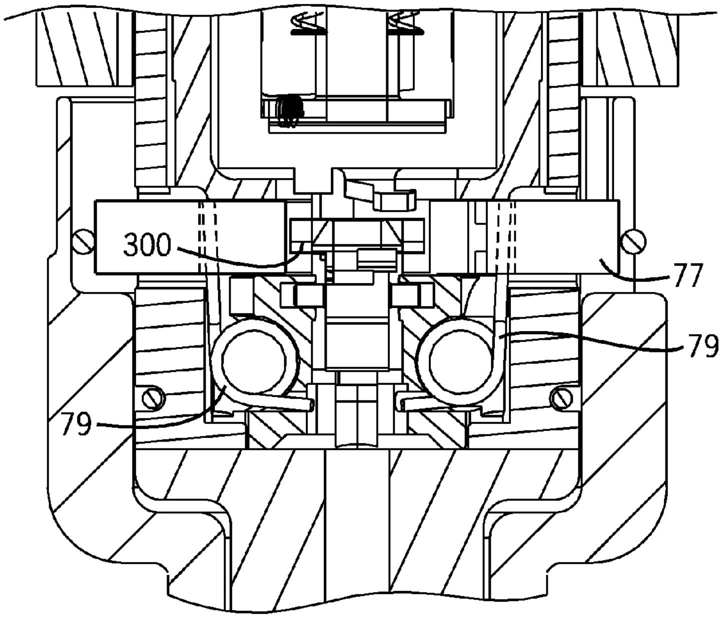
Figure 12:
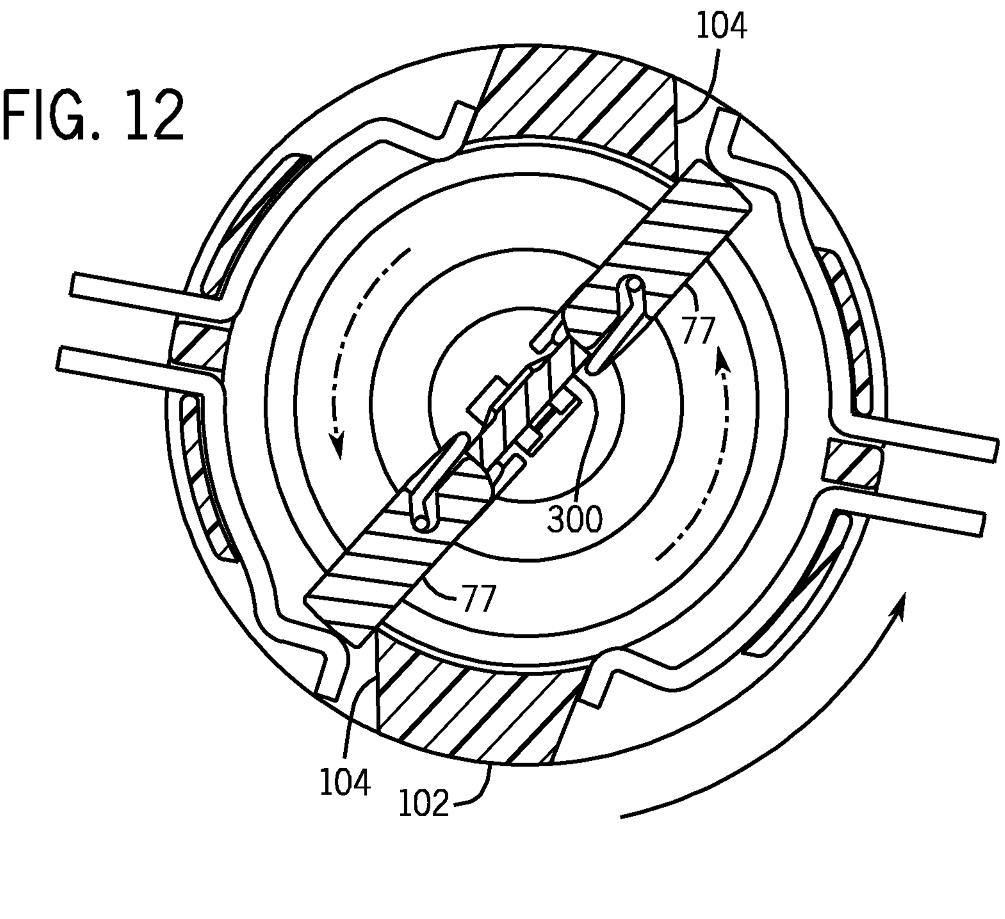
FIG. 12 is a sectional view of a coupling mechanism and actuator assembly in a coupled state.

Referring to FIGS. 11*a* and 11*b*, the lock 10 is in the coupled state, which means that the blocking member 300 is positioned between the camming blocks 77. The lock 10 has been handed (as will be discussed hereinafter) so that each of the camming blocks 77 is positioned nearer to one coupling wall 102 than to the other coupling wall 102 when the exterior handle 14 has not been rotated from its default position. The torsion springs 79 outwardly push the camming blocks 77 so that they contact a pair of spring ramps 99. When the exterior handle 14 rotated, rotation is transferred to the camming blocks 77, and the camming blocks 77 cam on the spring ramps 99 in the direction of rotation of the exterior handle 14. When the camming blocks 77 are rotated toward the nearest coupling wall 102, the camming blocks 77 will cam along the spring ramps 99 until they reach the ramp portions 112 of the spring ramps 99. As shown in FIG. 12, the camming blocks 77 are prevented from moving inward by the blocking member 300. Thus, the camming blocks 77 are able to overcome the force of the spring ramps 77 and can cause the spring ramps 99 to be pushed outward. The camming blocks 77 can then contact the edges 104 of the coupling walls 102 thereby transmitting torque to the outer coupling member 78 and causing the outer coupling member 78 to rotate. The rotation of the outer coupling member 78 causes the latch to operate and the door can be opened. If the camming blocks 77 are rotated in a direction away from the nearest coupling walls 102, the camming blocks 77 cam along the spring ramps 99 but will not rotate enough to reach the ramp portions 102. In another embodiment of the invention, the camming blocks 77 can transmit torque to the edges 104 of the coupling walls through the spring ramps 77 and thereby cause the outer coupling member 78 to rotate when the lock 10 is in the coupled state.

In other words, the drive 72, 83 and the take-off 78, 80 can be coupled when the blocking element 300 is positioned between the camming blocks 77. In the coupled state a movement of the exterior handle 16 can be transmitted from the drive to the take-off to actuate the latch member 18. However, in the decoupled state a movement of the drive 72, 83 causes a movement of the camming blocks 77, wherein said movement is not suitable for transmitting a movement from the drive 72, 83 to the take-off 78 so that a transmission of the movement is allowed in the coupled state but not in the decoupled state.

In this embodiment the take-off is formed essentially by two separate parts, namely the outer coupling member 78 and the link member 80. However, the outer coupling member 78 and the link member 80 can be also formed as one part or in other words can be integrally connected.

Further, in a preferred embodiment of the invention, the ends of the camming blocks 77 that contact the spring ramps 99 are generally square. In another embodiment of the invention, the ends of the spring ramps 99 that contact the spring ramps 99 can be square with filleted edges, chamfered, and/or rounded.

In another embodiment of the invention, the four spring ramps 99 may be replaced by a single band having four ramped surfaces extending from the band, the ramped surfaces configured to provide ramping like the ramping provided by the spring ramps 99. The spring force of the ramped surfaces is not overcome by the camming blocks in the decoupled state, but is overcome by the camming blocks in the coupled state.

The access control device 75 causes the lock 10 to move between coupled and decoupled states by moving the blocking member 300 between its coupled position and its decoupled position. Referring to FIGS. 18 and 19, the blocking member 300 has a blocking head 302 and a counterweight head 304. The blocking member 300 is in the coupled position when the blocking head 302 is positioned between the camming blocks 77. The blocking member 300 is in the decoupled position when the blocking head 302 is not positioned between the camming blocks 77. The blocking head 302 is sized and dimensioned to prevent the camming blocks 77 from moving radially inward in the coupled state as discussed hereinabove. The blocking member 300 is pivotably connected to the access control body 306, the blocking member 300 having pivot pins 305 and the access control body 306 having pivot pin receptors (not shown). As shown in FIG. 19, the blocking member 300 is pivotably attached to the right of the camming blocks 77 (closer to the exterior handle 16). The blocking member 300 has a spring chamber 310 on the same side of the pivot pins 305 as the blocking head 302. The spring chamber 310 is sized and dimensioned to receive and anchor a blocking member torsion spring 312. One end of the torsion spring 312 is anchored in the blocking member 300 and the other end of the torsion spring 312 is anchored in the access control body 306 so that the torsion spring 312 biases the blocking member 300 to rotate until the counterweight head 304 rests against a square block 314 of the access control body 306; therefore, the blocking head 302 will be positioned between the camming blocks 77 if the camming blocks 77 have not been moved radially inward so that the blocking head 302 cannot fit in between the camming blocks 77. Thus, the torsion spring 312 biases the blocking head 302 to be in the coupled state (to be positioned between the camming blocks 77).

The access control device 75 includes an actuator assembly 316. The actuator assembly 316 comprises a linkage push arm 318, a linkage hook arm 320, a switch element 322, a yoke 324, and a coil 326. The actuator assembly 316 can cause the linkage push aim 318 to move into and out of a position where the linkage push arm 318 pushes the blocking head 302 of the blocking member 300 out of a position between the camming blocks 77. The actuator assembly 316 is configured to transfer enough force to the linkage push arm 318 so as to overcome the spring force of the torsion spring 312 thereby causing the blocking member 300 to rotate in a direction opposite to the direction that the torsion spring 312 biases the blocking member 300. The linkage push arm 318 is sized and dimensioned so that it does not inhibit the camming blocks 77 from moving radially inward when it is positioned between the camming blocks 77 (and therefore the blocking head 302 is not positioned between the camming blocks 77).

The linkage push arm 318 is generally U-shaped. The linkage push aim 318 has a linkage head 328 disposed on the cross portion of the linkage push arm 318, the linkage head 328 extending towards the camming blocks 77. The ends of the linkage push arm 318 are pivotably connected to the linkage hook arm 320. The linkage push arm 318 further includes a spring catch 330 that extends near one end of the linkage push arm 318.

The linkage hook aim 320 has a generally rectangular shape and has a security hook 332 extending from the side of the linkage hook aim 320 that is nearest to the camming blocks 77. The security hook 332 extends in a direction perpendicular to the linkage head 328 of the linkage push aim 318. The linkage hook aim 320 is pivotably attached to the access control body 306 so that it can pivot on a pivot axis (not shown) that is perpendicular to a longitudinal axis (not shown) of the lock 10. The linkage push aim 318 pivots with the linkage hook arm 320. The switch element 322 is generally U-shaped with a middle section 334 and parallel end sections 336. The middle section 334 is flat and is generally wider than the end sections 336. The end sections 334 are flat near the middle section 334 and gradually curve towards their ends so that the switch element 322 can rock on a flat surface. The linkage hook arm 320 includes a set of recesses 338 sized and dimensioned to receive the ends of the end sections 336 of the switch element 322 and a set of hooks 340 that are sized and dimensioned to grip the middle section 334 of the switch element 322. Thus, the switch element 322, linkage push arm 318, and linkage hook aim 320 are arranged to pivot together, with the switch element 322 rocking on the yoke 324.

A linkage spring 342 pushes on the spring catch 330 of the linkage push arm 318 so that the linkage push aim 318, the linkage hook aim 320 and the switch element 322 are biased towards the yoke 324. Therefore, the linkage head 328 of the push arm 318 is biased to be in the decoupled state (i.e. biased to push the blocking head 302 from in between the camming blocks 77). In this decoupled state (as shown in FIG. 18), the linkage head 328 pushes on a push nub 344 of the blocking member 300. The push nub 344 is disposed on the blocking member 300 so that the blocking head 302 is not positioned between the camming blocks 77 when the linkage head 328 pushes on the push nub 344.

The access control device 75 can be controlled electronically by the access control circuitry to cause the linkage head 328 of the push arm 318 to move from the decoupled state to the coupled state. In the coupled state, the linkage head 328 is in a position where it does not push the blocking head 302; therefore, the blocking head 302 is positioned between the camming blocks 77 because the blocking head 302 is biased to that position and the linkage head 328 is not forcing the blocking head 302 from that biases position. To move the linkage head 328 into the coupled state, the access control device 75 causes the linkage push aim 318 to pivot away from the yoke 324. The linkage push arm 318 is pivoted away from the yoke 324 when the yoke 324 is magnetized and middle section 334 of the switch element 322 is thereby attracted to the yoke 324. When the yoke 324 is magnetically enabled, the magnetic attraction of the middle section 334 of the switch element 322 to the yoke 324 overcomes the force of the linkage spring 342 and the switch element 322 rocks so that the middle section 334 of the switch element comes into contact with the yoke 324 and the ends of the end sections 336 move away from the yoke 324. The switch element 322 thereby moves the linkage push arm 318 and linkage hook arm 320 thus putting the lock 10 in the coupled state.

The access control device 75 can switch the lock 10 from the coupled state to the decoupled state by demagnetizing the yoke 324 thus removing the magnetic attraction between the yoke 324 and the switch element 322 so that the linkage spring 342 returns the linkage push arm 318, the linkage hook aim 320, and the switch element 322 to the decoupled state.

In a preferred embodiment of the invention, the yoke 324 is a configured to be demagnetized by AC current (or other such electric current) applied to the coil 326 and magnetized by DC current (or other such electric current) applied to the coil 326. The switch element 322 is configured to be attracted to the magnetized yoke 324 with sufficient force to overcome the force of the linkage spring 342. The access control device 75 only requires power to switch between states thereby prolonging battery life. In another embodiment of the invention, an energized electromagnet can be used to place and hold the lock 10 in the coupled state. The lock may also be configured so that a solenoid can also be used to directly move the blocking member 300 in and out of alignment with the camming blocks 77. The blocking member 300 can also be moved to and from a position between the camming blocks 77 by an actuator such as an electromotor and/or a shape memory alloy and/or a piezoactuator and/or an electromagnet assembly and/or an actuator configured to transform an electronic signal into a mechanical movement.

Referring now to FIGS. 18-26, in a preferred embodiment of the invention, the access control device 75 further comprises a security assembly that prevents the lock 10 from changing between states when an external magnetic field is applied to the lock 10 in order to secure the lock 10 from tampering. The security assembly includes the security hook 332 of the linkage hook arm 320, a pair of security plates 346 and 347, and a security arm 348. The security aim 348 is pivotably connected to an access control support structure 350, which is connected to the access control body 306, at pivot points 352. The security arm 348 can pivot on a pivot axis (not shown) defined by the pivot points 352. The security arm 348 includes a camming aim 356 that extends upward from the security arm 348 and to the right of the spring catch 330 of the linkage push arm 318 (as shown in FIG. 20). The security arm 348 further includes a blocking aim 358 that extends downward from the security aim 348 and to the right of the yoke 324 (as shown in FIG. 19). The blocking arm 358 includes a blocking bar 360 perpendicularly extending from the end of the blocking aim 358 in a direction away from the yoke 324. A spring 362 is disposed between a spring retainer 364 extending from the camming aim 356 of the security arm 348 and a spring retainer 366 of the access control support structure 350. The spring 362 biases the security arm 348 so that the blocking arm 358 is to the left of the security hook 332 of the linkage hook aim 320 (as shown in FIG. 20). Thus, the blocking bar 360 does not inhibit movement of the security hook 332 in this position, and the lock 10 is said to be in the unsecured state. In the unsecured state, the security hook 332, and therefore, the other parts of the actuator assembly 316, are free to move so as to switch the lock 10 between the coupled and decoupled states.

The security plates 346 and 347 are generally square and include on one end mounting tabs 368 and 369, respectively, that extend through mounting orifices 370 in the access control support structure 350 so that the security plates 346 and 347 can be sandwiched together (as shown in FIG. 20) or can pivot to be separated (as shown in FIG. 22). The ends of the plates 346 and 347 opposite the mounting tabs 368 and 369 are in contact with a camming surface 372 on the inner portion of the camming arm 356. A spring 362 biases the security arm 348 so that the camming surface 372 causes the security plates 346 and 347 to be sandwiched together.

When an external magnetic force is applied to the lock 10 such as the external magnetic field 458 of a permanent magnet 460, the lock 10 becomes secured against changing states because the plates 346 and 347 become magnetically opposed to each other and are forced apart thereby causing the security arm 348 to move. The magnetic field of the yoke 324 and/or coil 326 do not cause the plates 346 and 347 to become magnetically opposed to each other. The upper plate 346 cams upward on a curved portion of the camming surface 372 until the plate 346 is blocked from further movement by cam stop of a security fork 374. The lower plate 347 cams downward until it is blocked from further movement by a cam stop 376 of the security arm 348. The plates 346 and 347 transmit force to the security arm 348 and the force of the spring 362 is overcome. The security aim 348 pivots so that the blocking bar 360 of the blocking arm 358 is aligned below or above the security hook 332 of linkage hook arm 320. Thus, the blocking bar 360 inhibits the security hook 332, either from moving up or down, which means that the lock 10 cannot change between the coupled and decoupled states. As shown in FIG. 22, the lock 10 is in the decoupled state and the blocking bar 360 blocks the security hook from moving up; therefore, the lock 10 cannot change from the decoupled state to the coupled state. As shown in FIG. 23, the lock 10 is in the coupled state and the blocking bar 360 blocks the security hook 332 from moving down; therefore, the lock 10 cannot change from the coupled state to the decoupled state.

To prevent the security hook 332 from moving the blocking bar 360 to an unblocking position when the lock 10 is in the decoupled state, and the security hook 332 is being forced upward in an attempt to change to the coupled state, the blocking bar 360 has an angled lower edge 378 that can engage an angled upper edge 380 of the security hook 332 so that the blocking bar 360 is not forced out of alignment with the security hook 332. As shown in FIG. 22, both the angled lower edge 378 of the blocking bar 360 and the angled upper edge 380 of the security hook 332 angle downward from left to right. If the security hook 332 is forced upwards (as it would be forced to when changing from the decoupled state to the coupled state), the edges 378 and 380 come into contact and cause the security arm 348 to be pushed towards the linkage hook arm 320 instead of being pushed away.

To prevent the security hook 332 from moving the blocking bar 360 to an unblocking position when the lock 10 is in the coupled state and the security hook 332 is being forced downward in an attempt to change to the decoupled state, the blocking bar 360 has an angled upper edge 382 that can engage a lower edge 384 of the security hook 332 so that the blocking bar 360 is not forced out of alignment with the security hook 332. As shown in FIG. 23, the angled upper edge 382 of the blocking bar 360 angles upward from left to right. If the security hook 332 is forced downward (as it would be forced to when changing from the coupled state to the decoupled state), the edges 382 and 384 come into contact and cause the security arm 348 to be pushed towards linkage hook arm 320 instead of away.

Figure 24:
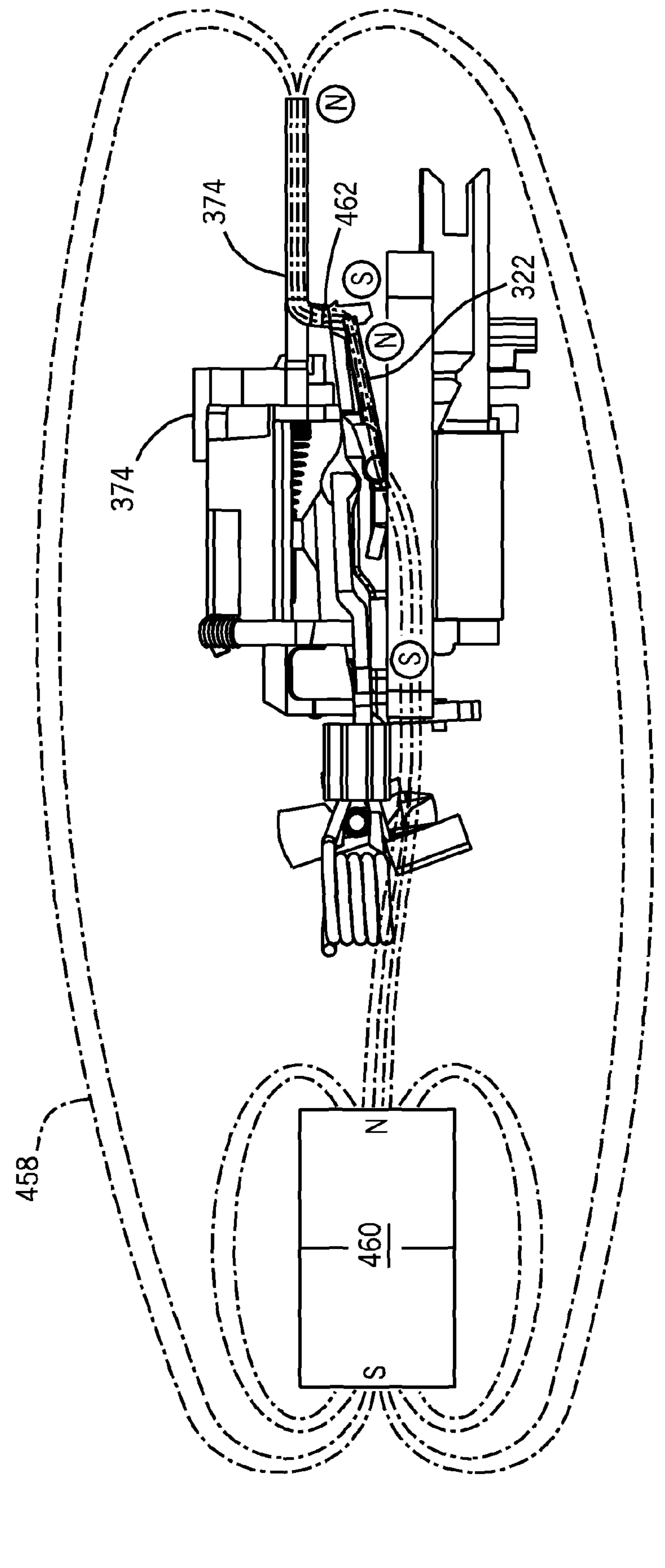
FIG. 24 is a side view of a security assembly and an actuator assembly of a handle set with an external magnetic field applied.
Figure 25:
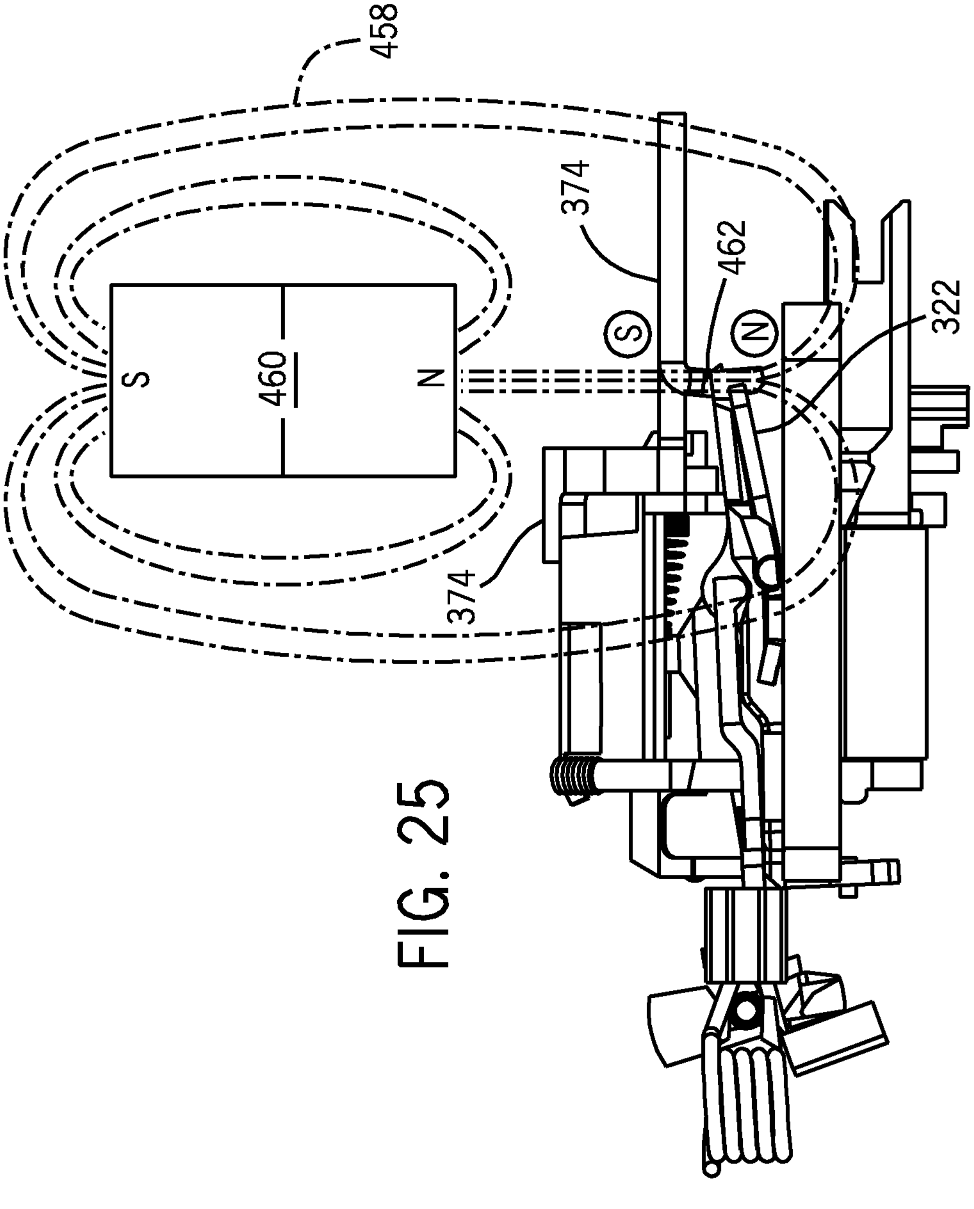
FIG. 25 is a side view of a security assembly and an actuator assembly with an external magnetic field applied.
Figure 26:
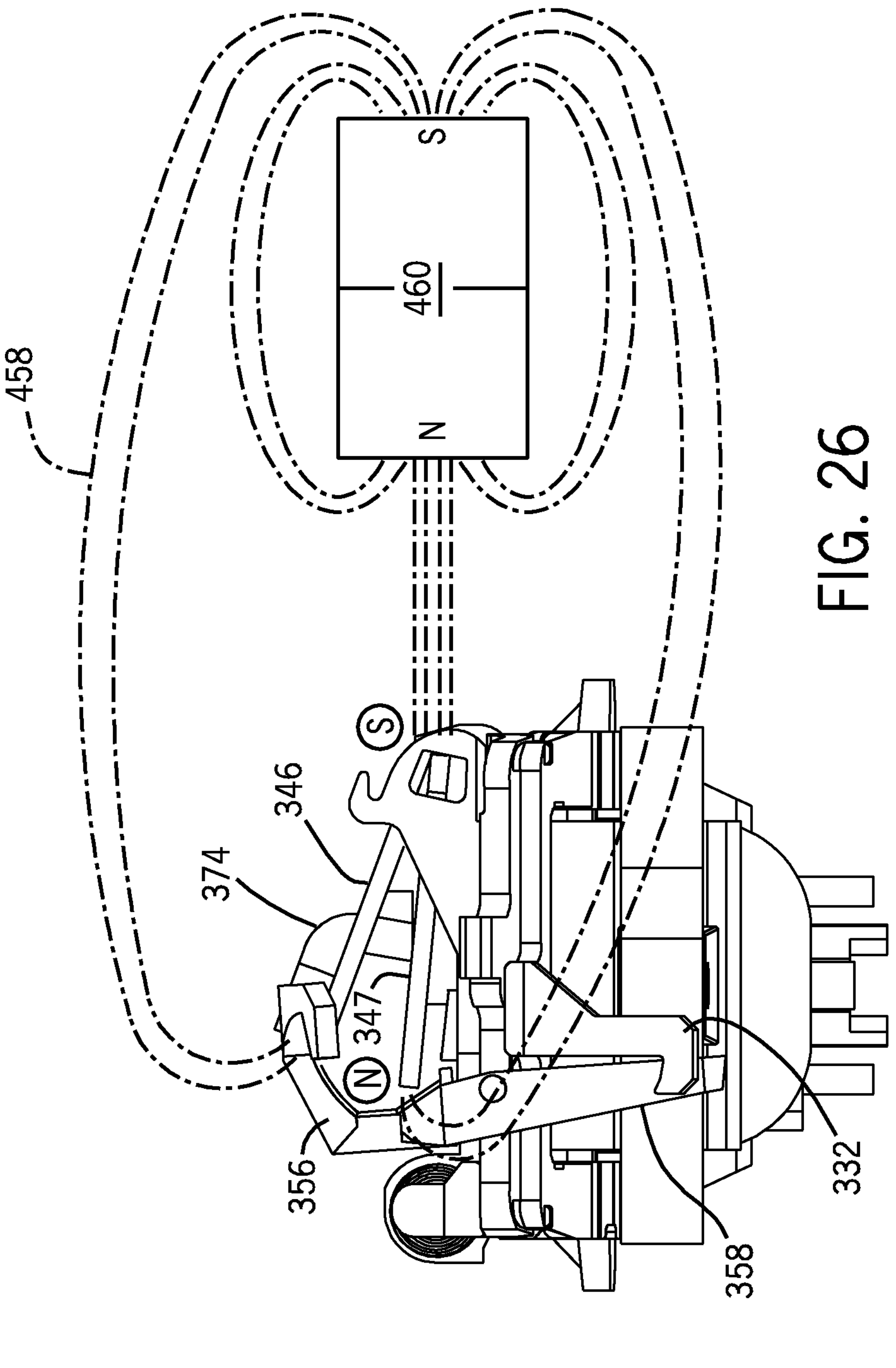
FIG. 26 is an end view of a security assembly and an actuator assembly of a handle set with an external magnetic field applied.

Referring now to FIGS. 24 and 25, the security fork 374 and switch element 322 are configured to provide further protection from tampering by an external magnetic field such as the magnetic field 458. The switch element 322 can be attracted to a lower finger 462 of the security fork 374 when an external magnetic field is applied thus preventing switching between the decoupled and coupled states.

The security assembly can include a mechanical, electromechanical and/or electromagnetic tampering sensor that sends a signal to the access control circuitry when the lock hardware 10 is tampered with by an external magnetic and/or electromagnetic field. The access control circuitry can then send a signal to a control center reporting the attempt to tamper with the lock 10 and/or can cause the lock 10 to make an alarm sound.

Figure 13:
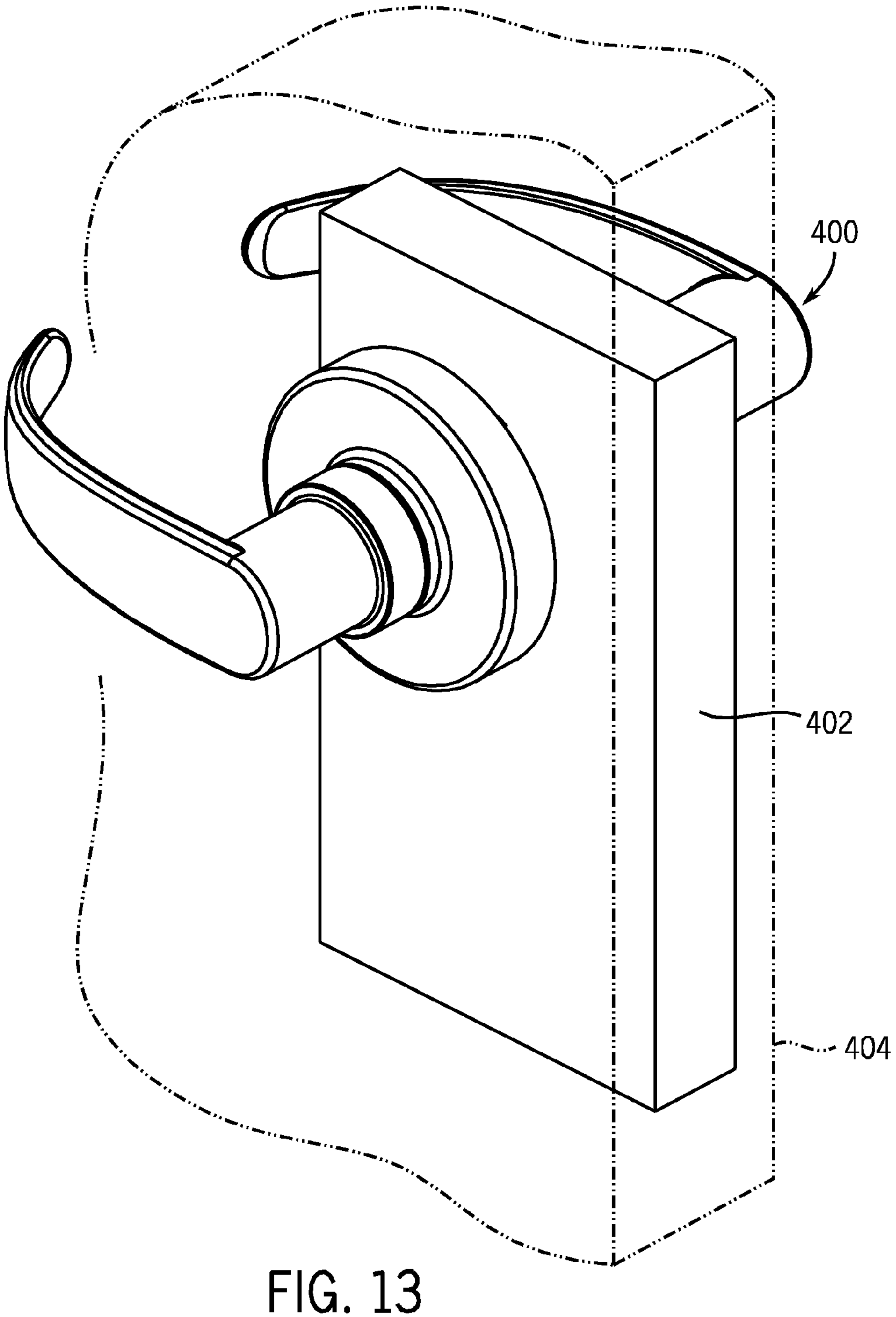
FIG. 13 is a perspective view of a handle set for a mortise lock according to an embodiment of the present invention installed in a door that is shown in phantom.
Figure 16:
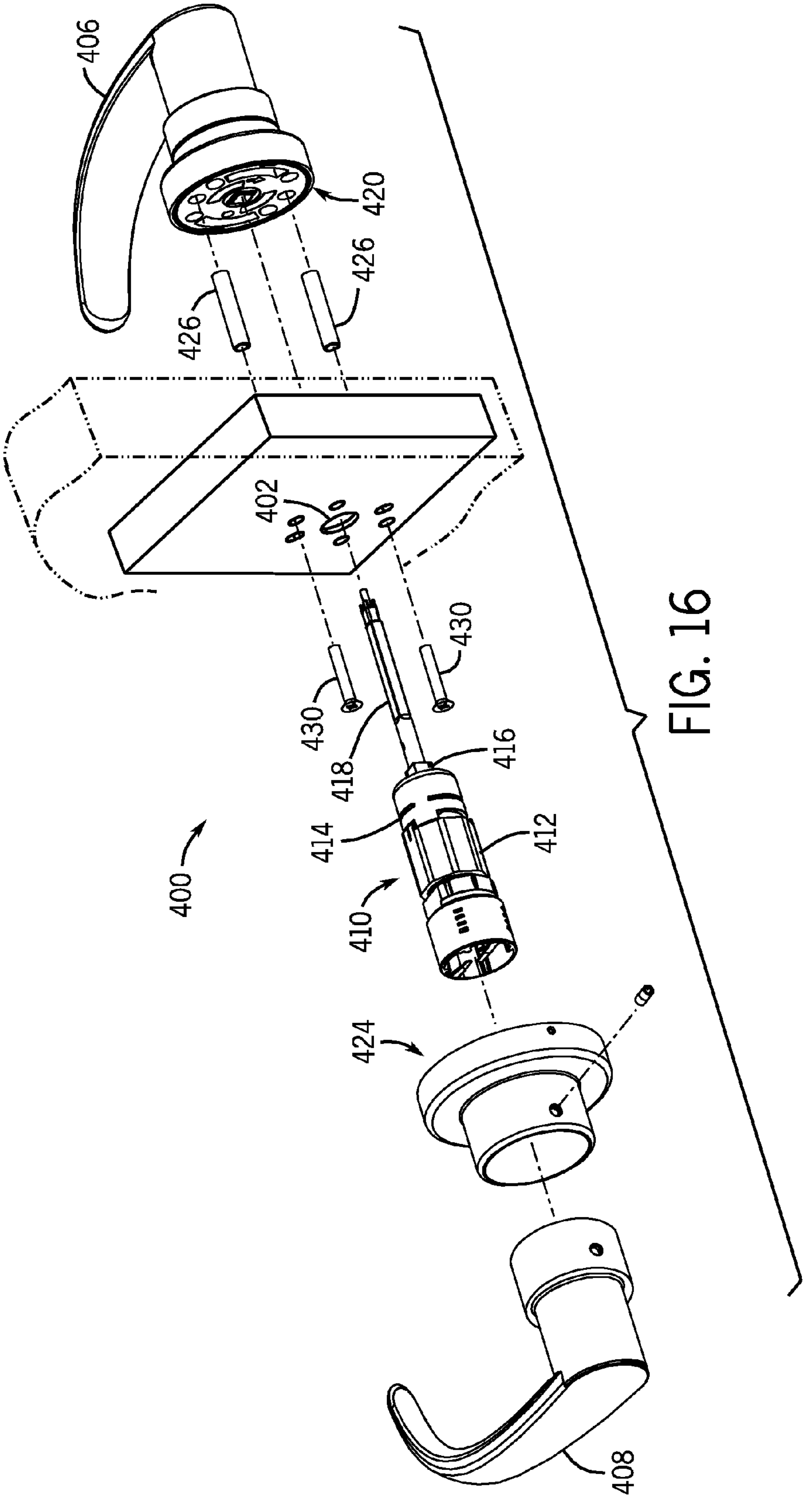
FIG. 16 is an exploded view of a handle set for a mortise lock according to an embodiment of the present invention.
Figure 17:
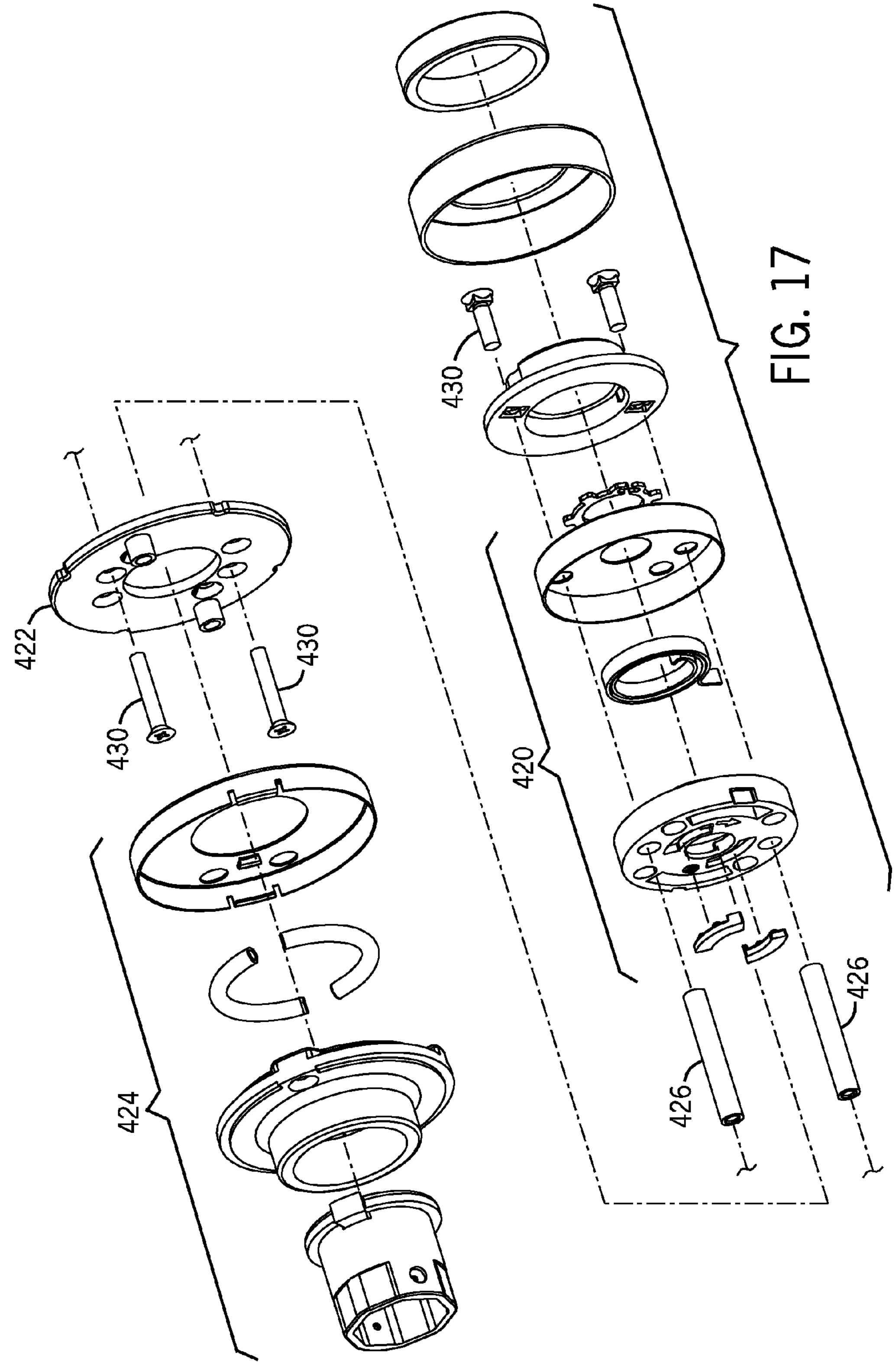
FIG. 17 is an exploded view of an adapter mechanism of the handle set shown in FIG. 16.

Referring now to FIGS. 13 and 16, there is generally shown handle set hardware 400 in accordance with an embodiment of the invention as operatively mounted in a mortise lock body 402 that is installed in a door 404. The handle set hardware 400 is configured to be retrofitted into already-installed mortise locks so that the mortise lock becomes a wireless electronic lock. The handle set hardware 400 replaces handles, shafts, spring returns, and other parts of the installed mortise lock. The handle set hardware 400 has an exterior handle 406 and an interior handle 408. The handles 406 and 408 are individually coupled to a coupling cartridge 410. The handles 406 and 408 are not coupled to each other directly thereby preventing a situation where one handle can prohibit the other handle from being actuated. The handle set hardware 400 is configured so that interior handle 408 transmits rotational force to a faceted coupling barrel 412. As discussed above with regard to the cylindrical lock 10, when the faceted coupling barrel 412 rotates, it can cause an outer coupling member 414 to rotate. The outer coupling member 414 includes a square link member 416 that transmits rotational movement to the mortise lock body 402 thereby operating the latch of the mortise lock body 402 when the outer coupling member 414 is rotated. The handle set hardware 400 is further configured so that the exterior handle 406 transmits rotational force to an exterior handle shaft 418 of the coupling cartridge 410. As discussed hereinabove with regard to the cylindrical lock 10, the exterior handle shaft 418 transmits rotational movement to the outer coupling member 414 when the handle set hardware 400 is in the coupled state and does not transmit rotational movement to the outer coupling member 414 when the lock 400 is in the decoupled state.

The mortise lock bodies of different manufacturers have different mounting hole configurations. The hardware 400 is configured so that it can be retrofitted with different mortise lock bodies. The hardware 400 includes an exterior spring block 420, an interior adapter plate 422, and an interior spring block 424. The exterior spring block 420 and interior adapter plate 422 are configured so that the handle set hardware 400 can be mounted to mortise lock bodies of different manufacturers. The exterior spring block 420 and interior adapter plate 422 have sets of holes that correspond to the mounting hole configurations of different mortise lock bodies. A pair of mounting tubes 426 extend through a set of mounting holes 428 of the mortise lock body 402 and through the corresponding holes in the exterior spring block 420 and interior adapter plate 422. The exterior spring block 420 and interior adapter plate 422 are secured to the mortise lock body 402 with a set of bolts 430 that are secured to the mounting tubes 426. The interior spring block 424 is then secured to the interior adapter plate 422. The remaining parts of the lock 400 can then be secured to the interior spring block 424 and the exterior spring block 420 so that the lock 400 functions in a similar manner to the cylindrical lock 10. The exterior spring block returns the exterior handle 406 to its default horizontal position after the handle 406 has been rotated. The interior spring block 424 returns the interior handle 408 to its default horizontal position after the interior handle 408 has been rotated. The interior spring block 424 is handed by rotating the cover of the interior spring block 424, the exterior spring block 420 is handed by flipping it over in a conventional manner.

Referring now to FIGS. 6, 7, 14, and 15, the difference between the coupling cartridge 410 for the mortise lock and the coupling cartridge 36 for the electronic cylinder lock is that the coupling cartridge 410 has a square link member 416 instead of an octagonal link member 80. The link members 80 and 416 transmit rotational movement to the lock bodies, which in turn cause the latches to operate. The square link member 416 is square because mortise locks are designed to accept square link members or shafts. Other than the difference between the link members 80 and 416, the coupling cartridges 36 and 410 are the same and operate in the same manner as discussed hereinabove with regard to the coupling cartridge 36.

Referring now to FIGS. 6 and 7, the coupling cartridge 36 is configured to be easily handed by an assembler before being packaged and/or by an installer during installation. The cartridge 36 needs to be handed because the faceted coupling barrel 82 and the camming blocks 77 will cause the outer coupling member 78 to actuate the latch only when rotated in one direction. The coupling cartridge 36 has a handing marking 450 on the faceted coupling barrel 82, a handing mark 452 on the round shaft portion 76 of the exterior handle shaft 72, a right-handed marking 454 on one face of the octagonal link member 80 of the outer coupling member 78, and a left-handed marling 456 on one face of the octagonal link member 80 of the outer coupling member 78. The coupling cartridge 36 is handed by first lining up the markings 450 and 452 and then by rotating the outer coupling member 78 so that either the right-handed marking 454 is lined up between the handing markings 450 and 452 (as shown in FIG. 7) or the left-handed marking 456 is lined up between the handing markings 450 and 452 (as shown in FIG. 6). The coupling cartridge 36 is then held in a right-hand or left-hand configuration until it is installed in the lock 10. When installed, the coupling cartridge 36 will remain in the default position until the handles are rotated.

Referring now to FIG. 6, which illustrates the left-hand configuration, the faceted coupling barrel 82 is aligned with the outer coupling member 78 so that one tooth 84 of the faceted coupling barrel 82 is positioned adjacent to and on the right of one tooth 88 of the outer coupling member 78. The faceted coupling barrel 82 will cause the outer coupling member 78 to rotate (and thereby operate the latch) when the faceted coupling barrel 82 is rotated so that a tooth 84 moves in a direction towards the nearest tooth 88. When the faceted coupling barrel 82 rotates in the opposite direction (i.e. when a tooth 84 moves away from the nearest tooth 88), the faceted coupling barrel 82 does not cause the outer coupling member 78 to rotate because the teeth 84 of the faceted coupling barrel do not engage the teeth 88 of the outer coupling member 78.

Referring now to FIG. 7, which illustrates the right-hand configuration, the faceted coupling barrel 82 is aligned with the outer coupling member 78 so that one tooth 84 of the faceted coupling barrel 82 is positioned adjacent to and on the left of one tooth 88 of the outer coupling member 78. The faceted coupling barrel 82 will cause the outer coupling member 78 to rotate (and thereby operate the latch) when the faceted coupling barrel 82 is rotated so that a tooth 84 moves in a direction towards the nearest tooth 88. When the faceted coupling barrel 82 rotates in the opposite direction (i.e. when a tooth 84 moves away from the nearest tooth 88), the faceted coupling barrel 82 does not cause the outer coupling member 78 to rotate because the teeth 84 of the faceted coupling barrel do not engage the teeth 88 of the outer coupling member 78.

Referring now to FIG. 9*a*, each camming block 77 is positioned nearer to one coupling wall 102 than the other, which coupling wall 102 is the nearest depends on the handing of the cartridge 36. When the lock 10 is in the coupled state, the camming blocks 77 transmit torque to the outer coupling member 78 only when the camming blocks 77 are rotated toward the nearest coupling wall 102. Otherwise, the camming blocks 77 rotate away from the nearest coupling wall 102, but do not reach the furthest coupling wall 102 so that the outer coupling member 78 is not rotated.

Figure 14:
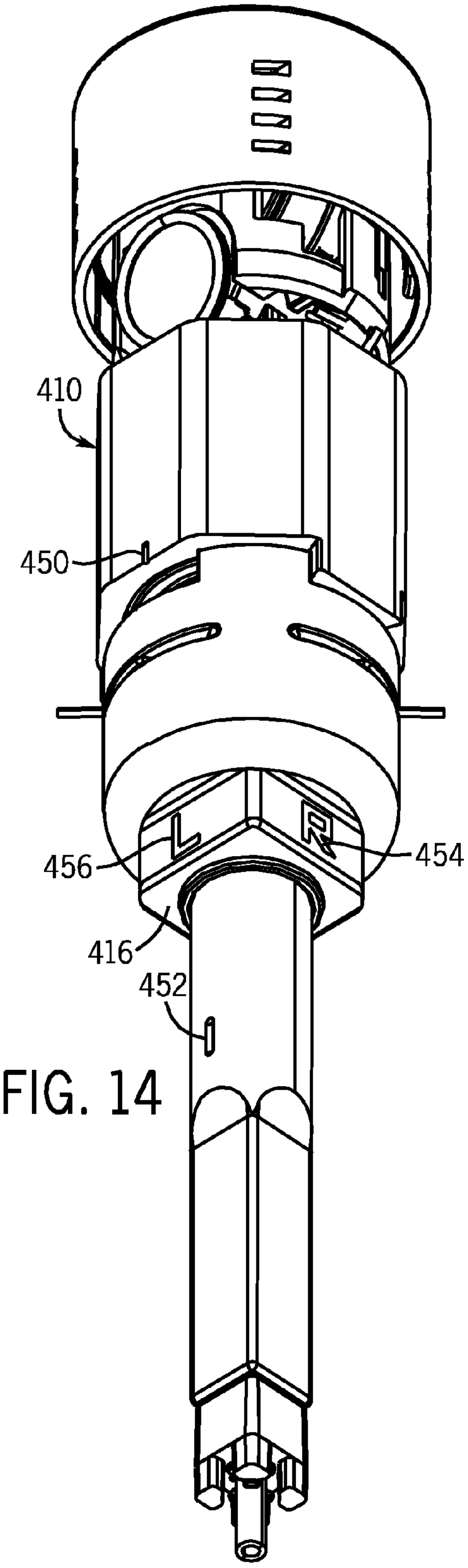
FIG. 14 is a perspective view of a coupling cartridge of a handle set for a mortise lock in a left-hand orientation.
Figure 15:
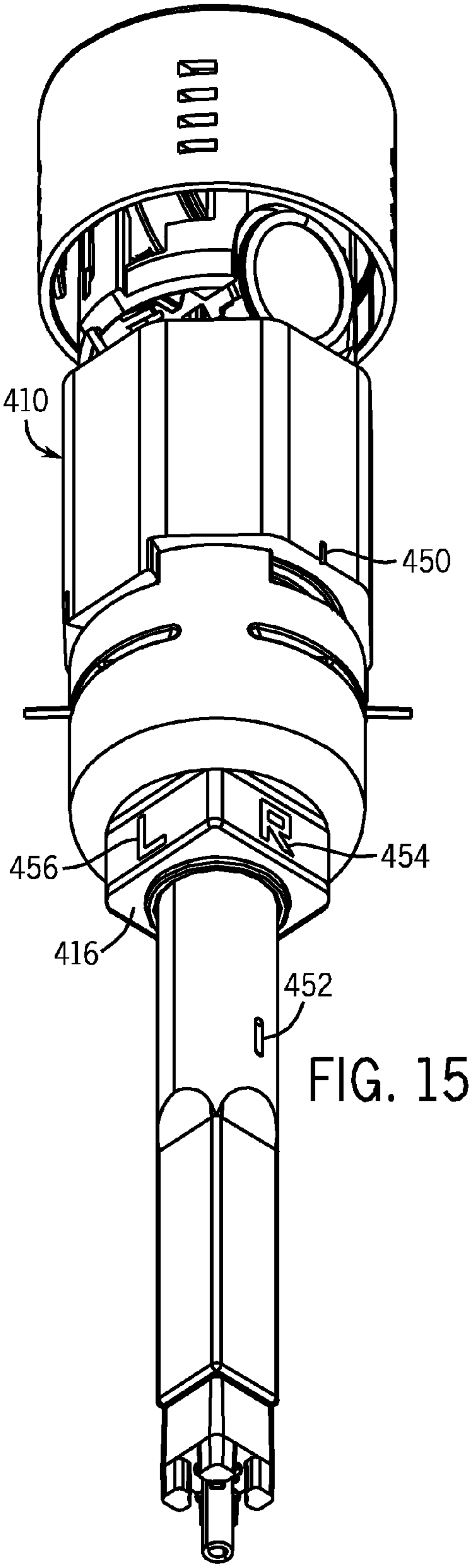
FIG. 15 is a perspective view of a coupling cartridge of a handle set for a mortise lock in a right-hand orientation.

Referring now to FIGS. 14 and 15, the coupling cartridge 410 for the mortise lock 400 is the same as the coupling cartridge 36 for the cylinder lock 10 except that the coupling cartridge 410 has a square link member 416 instead of an octagonal link member 80. The cartridge 410 is handed in the same manner that the cartridge 36 is handed.

The above description also applies essentially to another embodiment of the invention which relates to the double lock design. In an embodiment of the double lock design, the force and motion from the inside handle can be for example transferred to the take-off means 78, 80 through the coupling apparatus 36, 410 by the drive means 83 when the coupling apparatus is in a coupled state.

Preferred embodiments of the invention have been described in considerable detail. Many modifications and variations to the embodiments described will be apparent to those skilled in the art. Therefore, the invention should not be limited to the embodiments described, but should be defined by the claims that follow.

What is claimed is:

1. In a handle set for a lock with a latch, the handle set being for a door that is between an interior handle and an exterior handle of the handle set, the door having a central plane, wherein:

a coupling apparatus selectively couples the exterior handle to the latch, the coupling apparatus being activated by a non-contact signal from a transponder;

an authenticator circuit authenticates the signal from the transponder and controls an actuator;

wherein the authenticator circuit and the actuator are positioned on an interior side of the central plane of the door and at least partially housed in the interior handle, wherein the coupling apparatus comprises a force transfer member and an outer coupling member, wherein the force transfer member and outer coupling member are coupled via camming blocks in such a manner that a movement of the force transfer member causes a movement of the camming blocks, wherein said movement of the force transfer member is not transferred through the camming blocks to the outer coupling member in a decoupled state and is transferred through the camming blocks to the outer coupling member in a coupled state, wherein a blocking element can be positioned between the camming blocks in the coupled state, the blocking element preventing the camming blocks from giving way and thus coupling the force transfer member with the outer coupling member in the coupled state, and wherein the blocking element moves out of the way of the camming blocks in the decoupled state, further comprising a security apparatus that prevents the blocking element from being moved in the presence of an externally applied magnetic field, wherein said security apparatus comprises a movable security arm which is caused to actively pivot to a secure position when an external magnetic field is applied, wherein the blocking element cannot be moved between the camming blocks when said security arm has been moved in said secure position such that the lock cannot change from a decoupled to a coupled state.

2. The handle set of claim 1, wherein the outer coupling member includes a plurality of spring ramps and the camming blocks are each biased by a camming spring against one spring ramp, wherein a force exerted on each camming block by one of the spring ramps overcomes an opposite force exerted on each camming block by one camming spring to prevent each camming block from engaging a wall of the outer coupling member in the decoupled state.

3. The handle set of claim 2, wherein in the coupled state the blocking element prevents the camming blocks from being forced by the spring ramps away from the wall of the outer coupling member to allow the camming blocks to engage the wall of the outer coupling member, wherein the camming blocks can transfer torque to the outer coupling member when engaging the wall of the outer coupling member.

4. The handle set of any of claim 1, wherein the actuator changes the coupling state of the coupling apparatus, wherein the actuator comprises one of a permanent magnet, an electromagnet, an electromotor, a piezo-element, and a shape memory alloy.

5. The handle set of claim 1, wherein the actuator actuates the blocking element to move to a position between the camming blocks in the coupled state.

6. The handle set of claim 1, wherein force is not transferred from the camming blocks to the actuator.

7. The handle set of any of claim 1, wherein the authenticator circuit comprises at least one of an electronic processing unit and/or a memory unit and/or a power supply unit and/or a means for a wireless data exchange, wherein the electronic processing unit can compare a received signal of a user requesting access to the data stored in the memory unit and can further activate the actuator to change the coupling apparatus from the uncoupled state to the coupled state.

8. The handle set of claim 7, wherein an antenna for the wireless data exchange is located within the interior handle.

9. The handle set of claim 7, wherein an antenna for the wireless data exchange is located the outer handle or in an outer rose of said lock and is connected to the processing unit through a wire that is conducted through a connecting element of the coupling apparatus and wherein the antenna is suited to receive and handle signals from common-used passive or active cards operating at a frequency of 125 kHz or 13,56 MHz.

10. The handle set of claim 9, wherein biometric fingerprint sensing unit is connected to the processing unit through a wire that is conducted through the connecting element (72) of the connecting means (36; 410) and where the processing unit can compare a users's fingerprint with a fingerprint stored in the memory.

11. The handle set of any of claim 1, wherein , the exterior handle comprises a biometric fingerprint sensing unit, comprising at least a fingerprint reader, wherein the authenticator circuit controls the actuator to actuate the coupling apparatus when the biometric fingerprint reader senses an authorized fingerprint.

12. The handle set of claim 11, wherein biometric fingerprint sensing unit is equipped with a processing unit, a memory and a wireless data exchange unit and can compare a user's fingerprint with a fingerprint stored in the memory and can send a wireless authorisation signal to the access control device in the interior handle.

13. The handle set of any of claim 1, wherein the authenticator circuit can be programmed via a wireless connection from a programming device and wherein data stored in the authenticator circuit can be communicated to the programming device.

14. The handle set of claim 13, wherein the authenticator circuit can be programmed to control the coupling apparatus to temporarily switch between coupled and decoupled states, permanently switch between coupled and decoupled states, and automatically switch between coupled and decoupled states at predetermined times.

15. The handle set of any of claim 1, wherein a credential request signal is transmitted upon operation of the exterior handle, the transponder providing a credential signal upon receiving the credential request signal.

16. The handle set of any of claim 1, wherein the exterior handle includes a capacitive proximity sensor that senses operation of the exterior handle and triggers the transmission of the credential request signal.

17. Electronic door locking and lever assembly comprising:

an exterior handle and an interior handle positioned on opposite sides of a door, the exterior and interior handles linked with a coupling apparatus to actuate a latch member for opening the door from the inside and the outside, respectively, the coupling apparatus comprising a drive and a take-off, the take-off comprising a latch actuator to actuate the latch member;

an access control device which in response to an authorized wireless signal from an authorization device actuates the coupling apparatus so that the coupling apparatus can be changed between a coupled and decoupled state; and a coupling element which is linked to the take-off and the interior handle, wherein when the coupling apparatus is in a coupled state, the drive is coupled to the take-off wherein a movement of the exterior handle can be transmitted from the drive to the take-off to actuate the latch member to open the door;

wherein when the coupling apparatus is in a decoupled state, the drive is decoupled from the take-off so that a movement of the exterior handle does not operate the take-off to actuate the latch member to open the door;

wherein when the interior handle is moved, the movement is transmitted to the coupling element which moves the take-off so that the latch member can be operated when the coupling apparatus is in a coupled or decoupled state;

wherein the drive is coupled to the take-off by at least one camming block that transmits torque from the drive to the take-off when the camming block is blocked by a blocking element in the coupled state, and the blocking element is moved out of the way of the camming block in the decoupled state so that the camming block does not exert torque between the drive and the take-off, further comprising a security apparatus that prevents the blocking element from being moved in the presence of an externally applied magnetic field, wherein said security apparatus comprises a movable security arm which is caused to actively pivot to a secure position when an external magnetic field is applied, wherein the blocking element cannot be moved between the camming blocks when said security arm has been moved in said secure position such that the lock cannot change from a decoupled to a coupled state.

18. The electronic door locking and lever assembly according to claim 17, wherein there are at least two camming blocks, the blocking element moved between the camming blocks in the coupled state and is compressed by the camming blocks in the coupled state.

19. The electronic door locking and lever assembly according to claim 18, wherein the drive and take-off are coupled via the camming blocks in such a manner that in the decoupled state a rotational movement of the drive causes radial movement of the camming blocks and does not cause rotary movement of the take-off, and that in a coupled state a rotational movement of the drive causes rotary movement of the camming blocks and take-off.

20. The electronic door locking and lever assembly according to claim 17, wherein the access control device comprises an actuator to change the coupling state of the coupling apparatus, wherein the actuator actuates the blocking element to move the coupling apparatus in a coupled state.

21. The electronic door locking and lever assembly according to claim 20, wherein the blocking element and actuator are rotary levers.

22. The electronic door locking and lever assembly according to claim 20, wherein the blocking element is biased to the coupled state and the actuator is biased to the decoupled state.

23. Electronic door locking and lever assembly comprising:

(a) an exterior handle and an interior handle, (b) wherein the interior handle is linked with a coupling apparatus to actuate a latch member, for opening a door from the inside and wherein the coupling apparatus can couple the exterior handle to actuate the latch member for opening the door from the outside, (c) wherein the coupling apparatus comprises a drive means and a take-off means; wherein the take-off means comprises a latch actuating means to actuate the latch member;

(d) an access control device which in response to an authorized wireless signal from an authorization means actuates the coupling apparatus so that the coupling apparatus can be changed between a coupled or decoupled state, (e) a coupling element which is linked to the take-off means and the interior handle, (f) wherein when the coupling apparatus is in a coupled state, the drive means is coupled to the take-off means wherein a movement of the exterior handle can be transmitted from the drive means to the take-off means to actuate the latch member to open the door, (g) and wherein when the coupling apparatus is in a decoupled state, the drive means is decoupled from the take-off means so that a movement of the exterior handle is not suitable to operate the take-off means to actuate the latch member to open the door, (h) wherein when the interior handle is moved, the movement is transmitted to the coupling element which moves the take-off means so that the latch member can be operated when the coupling apparatus is in a coupled or decoupled state, (i) wherein the drive means comprises a force transfer member and the take-off means comprises an outer coupling member, wherein the drive means and the take-off means are coupled via camming blocks in such a manner that in the decoupled state a movement of the drive means causes a movement of the camming blocks, wherein said movement is not suitable for transmitting a movement from the drive means to the take-off means so that transmission of movement is allowed in the coupled state but not in the decoupled state, (j) wherein a blocking element can be positioned between the camming blocks in the coupled state, the blocking element preventing the camming blocks from giving way and thus coupling the force transfer member with the outer coupling member in the coupled state, and wherein the blocking element moves out of the way of the camming blocks in the decoupled state, (k) further comprising a security apparatus that prevents the blocking element from being moved in the presence of an externally applied magnetic field, (l) wherein said security apparatus comprises a movable security arm which is caused to actively pivot to a secure position when an external magnetic field is applied, wherein the blocking element cannot be moved between the camming blocks when said security arm has been moved in said secure position such that the lock cannot change from a decoupled to a coupled state.

24. An electronic door locking and lever assembly according to claim 23, wherein the coupling element and the take-off means form two separate parts which are coupled with each other or the coupling element and the take-off means are integrally connected.

25. An electronic door locking and lever assembly according to claim 23, wherein the access control device comprises an actuator to change the coupling state of the coupling apparatus, wherein the actuator can comprise an electromagnet and/or an electromotor and/or a piezo-element and/or a shape memory alloy.

26. An electronic door locking and lever assembly according to claim 23, wherein the access control device comprises an access control circuitry which comprises at least one of an electronic processing unit and/or a memory unit and/or a power supply unit and/or a means for a wireless data exchange, wherein the electronic processing unit can compare a received signal of a user requesting access to the data stored in the memory unit and can further activate the actuator to change the coupling apparatus from the uncoupled state to the coupled state.

27. An electronic door locking and lever assembly according to claim 26, wherein at least the processing unit and the memory unit are located within the interior handle.

28. An electronic door locking and lever assembly according to claim 23, comprising further a power supply, whereas the power supply can consist of a battery and/or an accu and/or a solar cell and/or a fuel cell.

29. An electronic door locking and lever assembly according to claim 23, wherein through operation of the exterior handle a signal is transmitted to the access control device in the interior handle, causing the access control device to emit a wireless request signal e.g. to a user's credential.

30. An electronic door locking and lever assembly according to claim 23, wherein the electronic door locking and lever assembly operates with the authorization means, wherein the authorization means is a transponder, wherein the transponder is able to exchange wireless data signals and wherein the transponder is adapted to be either worn by a user as a credential or mounted to or next to the door or mounted in the exterior handle and wherein the transponder can be activated by a user.

31. Electronic door locking and lever assembly comprising:

(a) an exterior handle and an interior handle, (b) wherein the interior handle is linked with a coupling apparatus to actuate a latch member, for opening a door from the inside wherein the coupling apparatus is housed within the interior handle and wherein the coupling apparatus can couple the exterior handle to actuate the latch member for opening the door from the outside, (c) wherein the coupling apparatus comprises a drive means and a take-off means; wherein the take-off means comprises a latch actuating means to actuate the latch member;

(d) an access control device which in response to an authorized wireless signal from an authorization means actuates the coupling apparatus so that the coupling apparatus can be changed between a coupled or decoupled state, (e) a coupling element which is linked to the take-off means and the interior handle, (f) wherein when the coupling apparatus is in a coupled state, the drive means is coupled to the take-off means wherein a movement of the exterior handle can be transmitted from the drive means to the take-off means to actuate the latch member to open the door, (g) and wherein when the coupling apparatus is in a decoupled state, the drive means is decoupled from the take-off means so that a movement of the exterior handle is not suitable to operate the take-off means to actuate the latch member to open the door, (h) wherein when the interior handle is moved, the movement is transmitted to the coupling element which moves the take-off means so that the latch member can be operated when the coupling apparatus is in a coupled or decoupled state, and (i) wherein the drive means comprises a force transfer member and the take-off means comprises an outer coupling member, wherein the drive means and the take-off means are coupled via camming blocks in such a manner that in the decoupled state a movement of the drive means causes a movement of the camming blocks, wherein said movement is not suitable for transmitting a movement from the drive means to the take-off means so that transmission of movement is allowed in the coupled state but not in the decoupled state, (j) wherein a blocking element can be positioned between the camming blocks in the coupled state, the blocking element preventing the camming blocks from giving way and thus coupling the force transfer member with the outer coupling member in the coupled state, and wherein the blocking element moves out of the way of the camming blocks in the decoupled state, (k) further comprising a security apparatus that prevents the blocking element from being moved in the presence of an externally applied magnetic field, and (l) wherein said security apparatus comprises a movable security arm which is caused to actively pivot to a secure position when an external magnetic field is applied, wherein the blocking element cannot be moved between the camming blocks when said security arm has been moved in said secure position such that the lock cannot change from a decoupled to a coupled state.

* * * * *